(12) United States Patent
Smith et al.

(10) Patent No.: US 11,039,276 B2
(45) Date of Patent: Jun. 15, 2021

(54) SYSTEM AND METHOD OF CALIBRATION FOR ESTABLISHING REAL-TIME LOCATION

(71) Applicants: DENSO International America, Inc., Southfield, MI (US); DENSO CORPORATION, Kariya (JP)

(72) Inventors: Eric J. Smith, Holland, MI (US); R. Michael Stitt, Ada, MI (US); Karl Jager, Zeeland, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 0 days.

(21) Appl. No.: 16/713,354

(22) Filed: Dec. 13, 2019

(65) Prior Publication Data
US 2020/0196098 A1  Jun. 18, 2020

Related U.S. Application Data

(60) Provisional application No. 62/779,859, filed on Dec. 14, 2018.

(51) Int. Cl.
| | | |
|---|---|---|
| *G08B 1/08* | (2006.01) |
| *H04W 4/02* | (2018.01) |
| *H04W 4/40* | (2018.01) |
| *H04B 17/21* | (2015.01) |

(Continued)

(52) U.S. Cl.
CPC .......... *H04W 4/026* (2013.01); *B60R 25/245* (2013.01); *H04B 17/21* (2015.01); *H04B 17/318* (2015.01); *H04W 4/40* (2018.02); *B60R 2325/20* (2013.01)

(58) Field of Classification Search
CPC ..... H04W 4/023; H04W 4/026; H04W 4/027; H04W 4/029; H04W 4/40; H04W 88/02; H04B 17/21; H04B 17/318; B60R 25/245; B60W 50/08
USPC .............. 340/539.1, 539.11, 539.13, 539.21, 340/539.23, 436, 988, 801; 701/36, 301; 455/345, 404.2, 456.1, 456.5, 521
See application file for complete search history.

(56) References Cited

U.S. PATENT DOCUMENTS

| | | | |
|---|---|---|---|
| 4,710,819 A | | 12/1987 | Brown |
| 5,515,419 A | * | 5/1996 | Sheffer ................. B60R 25/102 |
| | | | 455/456.5 |

(Continued)

FOREIGN PATENT DOCUMENTS

| | | |
|---|---|---|
| JP | 2008-281522 | 11/2008 |
| JP | 2013-031045 | 2/2013 |

OTHER PUBLICATIONS

International Search Report and the Written Opinion of the International Searching Authority for international application No. PCT/US2019/066258 dated Apr. 7, 2020.

*Primary Examiner* — Tai T Nguyen
(74) *Attorney, Agent, or Firm* — Warner Norcross + Judd LLP

(57) ABSTRACT

A system and method are provided for obtaining calibration data for a portable device relative to an object in order to facilitate defining a locator for determining a location of the portable device relative to the object. The system and method may obtain calibration data pertaining to a signal characteristic of communications transmitted from the portable device and corresponding to a known location of the portable device (e.g., truth data).

27 Claims, 9 Drawing Sheets

(51) Int. Cl.
*B60R 25/24* (2013.01)
*H04B 17/318* (2015.01)

(56) References Cited

U.S. PATENT DOCUMENTS

| | | | | |
|---|---|---|---|---|
| 7,289,786 | B2 * | 10/2007 | Krasner | G08B 25/016 |
| | | | | 455/404.2 |
| 2005/0130677 | A1 | 6/2005 | Meunier et al. | |
| 2005/0192056 | A1 | 9/2005 | Karaki | |
| 2005/0266855 | A1 | 12/2005 | Zeng et al. | |
| 2010/0141506 | A1 * | 6/2010 | Gulden | G01S 13/876 |
| | | | | 342/25 B |
| 2010/0323715 | A1 * | 12/2010 | Winters | G01S 5/0294 |
| | | | | 455/456.1 |
| 2015/0080014 | A1 * | 3/2015 | Ben-Yosef | H04W 4/33 |
| | | | | 455/456.1 |
| 2015/0334534 | A1 * | 11/2015 | Babu | H04W 4/33 |
| | | | | 370/328 |
| 2016/0088438 | A1 * | 3/2016 | O'Keeffe | H01H 9/02 |
| | | | | 455/456.2 |
| 2016/0316343 | A1 * | 10/2016 | Kan | H04W 4/022 |
| 2018/0020333 | A1 * | 1/2018 | Gillen | H04W 4/40 |
| 2019/0253836 | A1 * | 8/2019 | Sinha | H04W 4/02 |

* cited by examiner

SYSTEM AND METHOD OF CALIBRATION FOR ESTABLISHING REAL-TIME LOCATION

FIELD OF THE INVENTION

The present application relates to a system and method for calibrating a locator for a portable device with respect to an object, such as a vehicle.

BACKGROUND

Real-time location or position determinations for objects have become increasingly prevalent across a wide spectrum of applications. Real-time locating systems (RTLS) are used and relied on for tracking objects, such as portable devices, in many realms including, for example, automotive, storage, retail, security access for authentication, and security access for authorization.

One conventional RTLS system in the automotive realm includes a transceiver or master controller located within a vehicle and capable of communicating via radio frequency (RF) with a portable device. One or more aspects of the communications between the master controller and the portable device, such as signal strength of the communications, may be monitored and used as a basis for determining a location of the portable device relative to the vehicle. For instance, if the signal strength of communications is low, the portable device may be farther away from the vehicle relative to communications where the signal strength is high. In general, the strength of communications drops off as the distance increases between the portable device and the vehicle.

Using a function based on the relationship between signal strength and distance, the location of the portable device relative to the vehicle can be computed. However, the accuracy of the function is likely to vary significantly from application to application and among different environments. A function may be considered accurate for one system under set conditions, and then provide a result that is significantly inaccurate under different conditions or with a slightly different system. For instance, a function configured for one type of make and model of vehicle may perform poorly with another type of make and model of vehicle.

The conventional process of calibrating a function for different conditions can be time-consuming and inconsistent. Conventionally, this process involves manually moving the portable device relative to the vehicle to different positions. There is considerable variation among human testers and their capability to consistently place a remote device in a target location for a obtaining a sample. Additionally, the human tester's hand configuration and manner of holding the portable device may vary from calibration test to test, and even from position to position.

SUMMARY

A system and method are provided for obtaining calibration data for a portable device relative to an object in order to facilitate defining a locator for determining a location of the portable device relative to the object. The system and method may obtain calibration data pertaining to a signal characteristic of communications transmitted from the portable device and corresponding to a known location of the portable device (e.g., truth data).

In one embodiment, a system is provided for calibrating a locator for determining a location of a portable device relative to an object. The system may include an object device, a control system, and a movable body. The object device may be disposed in a fixed position relative to the object, and may include an antenna configured to communicate wirelessly with the portable device via a communication link. The control system may be configured to obtain one or more calibration samples for a signal characteristic of communications with the portable device. For instance, the control system may be configured to obtain a first set of the one or more calibration samples with respect to the portable device being at a first position, and to obtain a second set of the one or more calibration samples with respect to the portable device being at a second position.

The movable body may be operably coupled to the portable device and configured to position the portable device in accordance with a position directive communicated from the control system. The control system may be configured to direct movement of the movable body to change a position of the portable device from the first position to the second position.

In one embodiment, a method is provided for calibrating a system to determine location information pertaining to a location of a remote device relative to an object. The method may include providing a test device capable of communicating wirelessly with the object via a communication link, and disposing the test device at a first position relative to the object. One or more first position calibration samples may be obtained for a signal characteristic of communications with the reference device at the first position. The reference device may be automatically moved from the first position to a second position relative to the object, and one or more second position calibration samples may be obtained for the signal characteristic of communications with the reference device at the second position. The method may include determining one or more parameters for a locator based on the one or more first position calibration samples and the one or more second position calibration samples.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION

Figure 1:
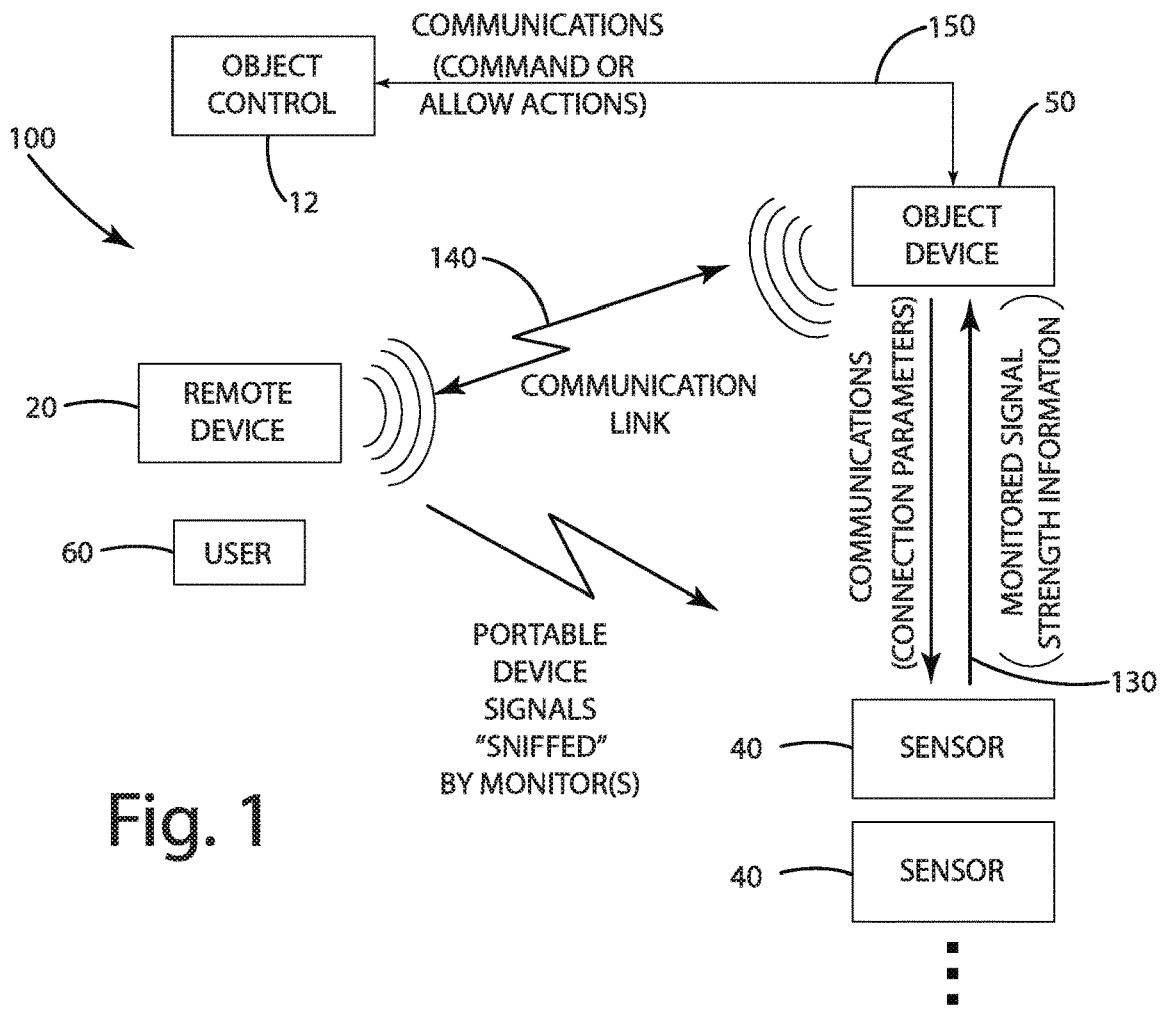
FIG. 1 shows a representative view of a system in accordance with one embodiment.

A system and method are provided for obtaining calibration data for a portable device relative to an object to facilitate defining a locator for determining a location of the portable device relative to the object. The system and method may obtain calibration data pertaining to a signal characteristic of communications transmitted from the portable device and corresponding to a known location of the portable device (e.g., truth data). With the calibration data, the locator may be configured to generate a location output that corresponds to the known location. The portable device may be moved automatically from location to location relative to the object so that the calibration data may be obtained for multiple locations of the portable device relative to the object.

In one embodiment, for a portable device, a plurality of samples may be obtained with respect to communications between the remote device and an object device to determine one or more parameters for configuring a locator. The locator in conjunction with the one or more parameters may be operable to determine a location of the remote device relative to the object based on communications between the remote device and the object device. For instance, a first sample may be obtained by measuring, in the object device and one or more sensors, a signal strength of communications transmitted from the remote device to the object device, while the portable device is located at a first position relative to the object. A second sample may be obtained in a similar manner while the portable device is located at a second position relative to the object. Together, the first and second samples may correspond to truth information that may be provided to a calibration system for determining one or more parameters for a locator to output a location based on one or more measurements of the signal characteristic obtained from the object device and the one or more sensors, where the output of the locator corresponds to the location provided in the truth data within a degree of confidence.

In one embodiment, the portable device may be positioned automatically with respect to the object in three dimensions. Additionally, an angular orientation of the portable device may be varied at a position in three-dimensional space. In this way, within a Cartesian coordinate system, the portable device may be positioned automatically according to target values for an X position, a Y position, a Z position, roll ($\varphi$), pitch ($\theta$), and yaw ($\psi$). By automatically controlling a position and orientation of the portable device relative to the object, truth information may be obtained in a consistent and controlled manner. This consistency may carry over to adapting the locator for various types of conditions, such as for different makes and models of vehicles.

To provide an example, the locator may be trained on a table of the plurality of samples obtained with respect to communications between the reference device and the object device and one or more sensors disposed in a fixed position on the object. The plurality of samples may include one or more signal characteristics of the communications. Example signal characteristics include signal strength (e.g., RSSI), angle of arrival (AOA), and time-of-flight (TOF). The samples may be obtained in the object device or may be communicated from a sensor (disposed in a fixed position relative to the object) to the object device.

The table may also include truth information or truth data for each sample. The truth information may correspond to one or more outputs, which may include an observed position and an observed parameter, or a combination thereof.

In one embodiment, a plurality of samples and associated truth information may form the basis of a training data set (and potentially a validation data set) for a machine learning algorithm to vary one or more parameters of the locator. The locator in conjunction with the one or more parameters may be capable of providing one or more outputs based on a sample of the one or more signal characteristics of communication. A sample obtained may be provided to the locator to obtain the one or more outputs, which may closely relate to truth information obtained with respect to the sample (assuming the one or more parameters are tuned for the training set). The locator may be trained within a degree of confidence for the training data set so that the one or more outputs obtained from the locator with respect to a sample may be considered accurate to within the established degree of confidence.

In one embodiment, the locator may include one or more core functions and a plurality of tunable parameters associated with the one or more core functions. The plurality of tunable parameters may be adjusted so that the locator provides one or more outputs, based on one or more inputs (e.g., the samples), that are similar to the truth information. A gradient descent optimization algorithm may be utilized to adjust the tunable parameters in conjunction with a score function. In addition to or alternative to the score function, an error function may be utilized, such as mean square error. The score function may provide a score corresponding to similarity between the one or more outputs of the locator and the truth information. The gradient descent optimization algorithm may be configured to adjust the tunable parameters to substantially maximize the score of the score function or the similarity between the one or more outputs of the locator and the truth information.

As discussed herein, a system and method are provided for determining location information for a remote device relative to an object. The system and method may be adapted to determine such location information for different types of remote devices and different types of objects. To provide an example, the remote device may be a Phone as a Key (PaaK) or a smart phone and the object may be a vehicle. More specifically, in this example, the system and method may be adapted to determine location information with respect to an iPhone 6s and a 2018 Toyota Corolla, and may also be adapted to determine location information with respect to a Samsung Galaxy S9 and a 2018 Ford Explorer. One type of portable device may be considered a "golden device" or reference device and may be used in accordance with the system and method herein for training or determining the parameters for the locator. Calibration for one or more other types of portable devices may be conducted in a similar manner, except an adapter locator for adapting one or more aspects of the locator may be provided. The truth information for the other types of portable devices may form the basis for determining one or more parameters of the adapter locator.

As an example, in a BLE PaaK system that uses Received Signal Strength Indicator (RSSI) measurements, a calibration process is provided for a remote device 20 (e.g., portable device, such as a phone) to determine an average RSSI offset, which may be a value that compensates for the remote device's antenna gain and other construction factors, as averaged across common phone postures (e.g., in hand, in front pocket, in back pocket, in purse, etc.), that contribute to the transmission of signals to/from the object (e.g., a vehicle), relative to a "golden device" also described as a reference device (from which the vehicle's algorithm calibrations can be based). In other words, the result of the calibration process in one embodiment is an offset that is applied to RSSI measurements for each remote device 20 within a vehicle-based RSSI measurement system relative to the reference device. One or more additional examples of this configuration are described in U.S. Provisional Application No. 62/779,740 entitled A SYSTEM AND METHOD OF CALIBRATION FOR ESTABLISHING REAL-TIME LOCATION, to Eric J. Smith and R. Michael Stitt, filed Dec. 14, 2018—the disclosure of which is hereby incorporated by reference in its entirety.

The calibration process in one embodiment may result in more than one value—such as an RSSI offset and a variability indicator—but, for purposes of discussion, one or more embodiments herein are described in conjunction with tuning one parameter—an RSSI offset. For example, the "golden device" may be an iPhone 6 or a BLE key fob (offset 0) and an Android Galaxy S7 may use an offset of +8; conversely, the Galaxy S7 may be the "golden device" (offset 0) and an iPhone 6 may then use an offset of −8.

I. System Overview

Figure 2:
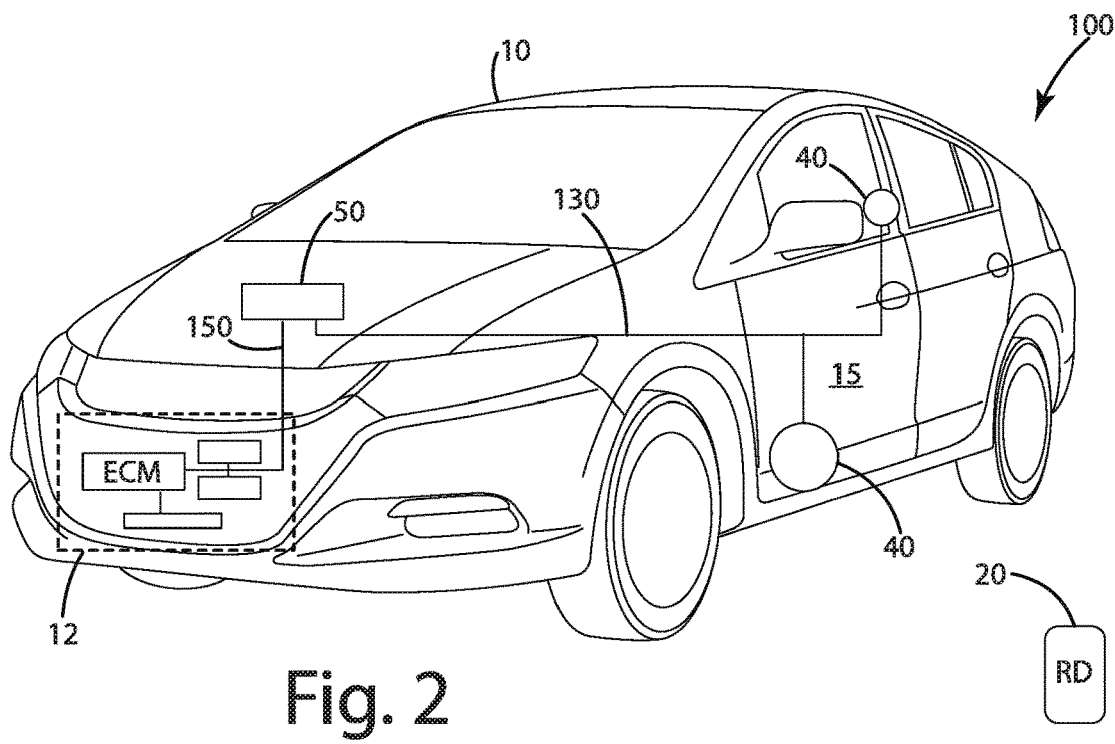
FIG. 2 depicts a representative view of the system in FIG. 1 disposed at least in part on an object.

A system in accordance with one embodiment is shown in the illustrated embodiment of FIGS. 1 and 2 and generally designated 100. The system 100 may include one or more system components as outlined herein. A system component may be a user 60 or an electronic system component, which may be the remote device 20, a sensor 40, or an object device 50, or a component including one or more aspects of these devices. The underlying components of the object device 50, as discussed herein, may be configured to operate in conjunction with any one or more of these devices. In this sense, in one embodiment, there may be several aspects or features common among the remote device 20, the sensor 40, and the object device 50. The features described in connection with the object device 50 depicted in FIG. 3 may be incorporated into the remote device 20 or the sensor 40, or both. In one embodiment, the object device 50 may form an equipment component disposed on an object 10, such as a vehicle or a building. The object device 50 may be communicatively coupled to one or more systems of the object 10 to control operation of the object 10, to transmit information to the one or more systems of the object 10, or to receive information from the one or more systems of the object 10, or a combination thereof. For instance, the object 10 may include an object controller 12 configured to control operation of the object 10. The object 10 may include one or more communication networks, wired or wireless, that facilitate communication between the object controller 12 and the object device 50. The communication network for facilitating communications between the object device 50 and the object controller 12 is designated 150 in the illustrated embodiment of FIG. 2 and provided as a CAN bus; however, it is to be understood that the communication network is not so limited. The communication network may be any type of network, including a wired or wireless network, or a combination of two or more types of networks.

Figure 3:
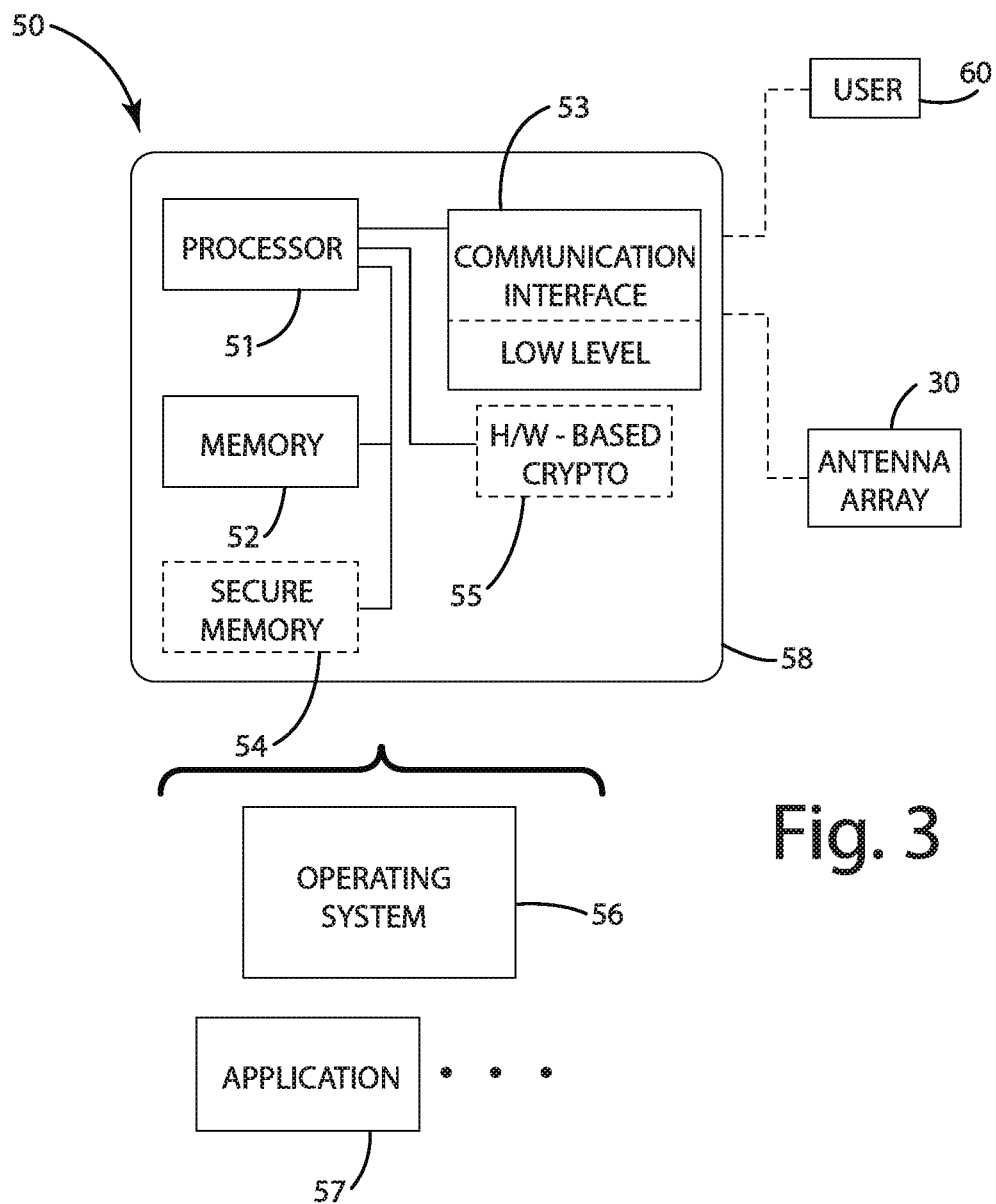
FIG. 3 shows a system component in accordance with one embodiment.

In the illustrated embodiment of FIG. 3, the object device 50 may include a control system or controller 58 configured to control operation of the object device 50 in accordance with the one or more functions and algorithms discussed herein, or aspects thereof. The system components, such as the remote device 20 or the sensor 40, or both, may similarly include a controller 58.

The controller 58 may include electrical circuitry and components to carry out the functions and algorithms described herein. Generally speaking, the controller 58 may include one or more microcontrollers, microprocessors, and/or other programmable electronics that are programmed to carry out the functions described herein. The controller 58 may additionally or alternatively include other electronic components that are programmed to carry out the functions described herein, or that support the microcontrollers, microprocessors, and/or other electronics. The other electronic components include, but are not limited to, one or more field programmable gate arrays, systems on a chip, volatile or nonvolatile memory, discrete circuitry, integrated circuits, application specific integrated circuits (ASICs) and/or other hardware, software, or firmware. Such components can be physically configured in any suitable manner, such as by mounting them to one or more circuit boards, or arranging them in other manners, whether combined into a single unit or distributed across multiple units. Such components may be physically distributed in different positions in the object device 50, or they may reside in a common location within the object device 50. When physically distributed, the components may communicate using any suitable serial or parallel communication protocol, such as, but not limited to, CAN, LIN, Vehicle Area Network (VAN), FireWire, I2C, RS-232, RS-485, and Universal Serial Bus (USB).

As described herein, the terms locator, module, model, and generator designate parts of the controller 58. For instance, a model or locator in one embodiment is described as having one or more core functions and one or more parameters that affect output of the one or more core functions. Aspects of the model or locator may be stored in memory of the controller 58, and may also form part of the controller configuration such that the model is part of the controller 58 that is configured to operate to receive and translate one or more inputs and to output one or more outputs. Likewise, a module or a generator are parts of the controller 58 such that the controller 58 is configured to receive an input described in conjunction with a module or generator and provide an output corresponding to an algorithm associated with the module or generator.

The controller 58 of the object device 50 in the illustrated embodiment of FIG. 3 may include one or more processors 51 that execute one or more applications 57 (software and/or includes firmware), one or more memory units 52 (e.g., RAM and/or ROM), and one or more communication interfaces 53, amongst other electronic hardware. The object device 50 may or may not have an operating system 56 that controls access to lower-level devices/electronics via a communication interface 53. The object device 50 may or may not have hardware-based cryptography units 55—in their absence, cryptographic functions may be performed in software. The object device 50 may or may not have (or have access to) secure memory units 54 (e.g., a secure element or a hardware security module (HSM)). Optional components and communication paths are shown in phantom lines in the illustrated embodiment.

The controller 58 in the illustrated embodiment of FIG. 3 is not dependent upon the presence of a secure memory unit 54 in any component. In the optional absence of a secure memory unit 54, data that may otherwise be stored in the secure memory unit 54 (e.g., private and/or secret keys) may be encrypted at rest. Both software-based and hardware-based mitigations may be utilized to substantially prevent access to such data, as well as substantially prevent or detect, or both, overall system component compromise. Examples of such mitigation features include implementing physical obstructions or shields, disabling JTAG and other ports, hardening software interfaces to eliminate attack vectors, using trusted execution environments (e.g., hardware or software, or both), and detecting operating system root access or compromise.

For purposes of disclosure, being secure is generally considered being confidential (encrypted), authenticated, and integrity-verified. It should be understood, however, that the present disclosure is not so limited, and that the term "secure" may be a subset of these aspects or may include additional aspects related to data security.

The communication interface 53 may provide any type of communication link, including any of the types of communication links described herein, including wired or wireless. The communication interface 53 may facilitate external or internal, or both, communications. For instance, the communication interface 53 may be coupled to or incorporate the antenna array 30. The antenna array 30 may include one or more antennas configured to facilitate wireless communications, including Bluetooth Low Energy (BLE) communications.

As another example, the communication interface 53 may provide a wireless communication link with another system component in the form of the remote device 20, such as wireless communications according to the WiFi standard. In another example, the communication interface 53 may be configured to communicate with an object controller 12 of a vehicle (e.g., a vehicle component) via a wired link such as a CAN-based wired network that facilitates communication between a plurality of devices. The communication interface 53 in one embodiment may include a display and/or input interface for communicating information to and/or receiving information from the user 60.

In one embodiment, the object device 50 may be configured to communicate with one or more auxiliary devices other than another object device 50 or a user. The auxiliary device may be configured differently from the object device 50—e.g., the auxiliary device may not include a processor 51, and instead, may include at least one direct connection and/or a communication interface for transmission or receipt, or both, of information with the object device 50. For instance, the auxiliary device may be a solenoid that accepts an input from the object device 50, or the auxiliary device may be a sensor (e.g., a proximity sensor) that provides analog and/or digital feedback to the object device 50.

The system 100 in the illustrated embodiment may be configured to determine location information in real-time with respect to the remote device 20. In the illustrated embodiment of FIG. 1, the user 60 may carry the remote device 20 (e.g., a smartphone). The system 100 may facilitate locating the remote device 20 with respect to the object 10 (e.g., a vehicle) in real-time with sufficient precision to determine whether the user 60 is located at a position at which access to the object 10 or permission for an object 10 command should be granted.

For instance, in an embodiment where the object 10 is a vehicle, the system 100 may facilitate determining whether the remote device 20 is outside the vehicle but in close proximity, such as within 5 feet, 3 feet, or 2 feet or less, to the driver-side door 15. This determination may form the basis for identifying whether the system 100 should unlock the vehicle. On the other hand, if the system 100 determines the remote device 20 is outside the vehicle and not in close proximity to the driver-side door (e.g., outside the range of 2 feet, 3 feet, or 5 feet), the system 100 may determine to lock the driver-side door. As another example, if the system 100 determines the remote device 20 is in close proximity to the driver-side seat but not in proximity to the passenger seat or the rear seat, the system 100 may determine to enable mobilization of the vehicle. Conversely, if the remote device 20 is determined to be outside close proximity to the driver-side seat, the system 100 may determine to immobilize or maintain immobilization of the vehicle.

The object 10 may include multiple object devices 50 or a variant thereof, such as an object 50 including a sensor 40 coupled to an antenna array 30, in accordance with one or more embodiments described herein.

Micro-location of the remote device 20 may be determined in a variety of ways, such as using information obtained from a global positioning system, one or more signal characteristics of communications from the remote device 20, and one or more sensors (e.g., a proximity sensor, a limit switch, or a visual sensor), or a combination thereof. An example of microlocation techniques for which the system 100 can be configured are disclosed in U.S. Nonprovisional patent application Ser. No. 15/488,136 to Raymond Michael Stitt et al., entitled SYSTEM AND METHOD FOR ESTABLISHING REAL-TIME LOCATION, filed Apr. 14, 2017—the disclosure of which is hereby incorporated by reference in its entirety.

In one embodiment, in the illustrated embodiment of FIG. 1-3, the object device 50 (e.g., a system control module (SCM)) and a plurality of sensors 40 (coupled to an antenna array 30 shown in FIG. 3) may be disposed on or in a fixed position relative to the object 10. Example use cases of the object 10 include the vehicle identified in the previous example, or a building for which access is controlled by the object device 50.

The remote device 20 may communicate wirelessly with the object device 50 via a communication link 140, such as a BLE communication link or an Ultra Wideband (UWB) communication link. The plurality of sensors 40 may be configured to sniff the communications of the communication link 140 between the remote device 20 and the object device 50 to determine one or more signal characteristics of the communications, such as signal strength, time of arrival, time of flight, or angle of arrival, or a combination thereof. The determined signal characteristics may be communicated or analyzed and then communicated to the object device 50 via a communication link 130 separate from the communication link between the portable devices 20 and the object device 50. Additionally, or alternatively, the remote device 20 may establish a direct communication link with one or more of the sensors 40, and the one or more signal characteristics may be determined based on this direct communication link.

Figure 14:
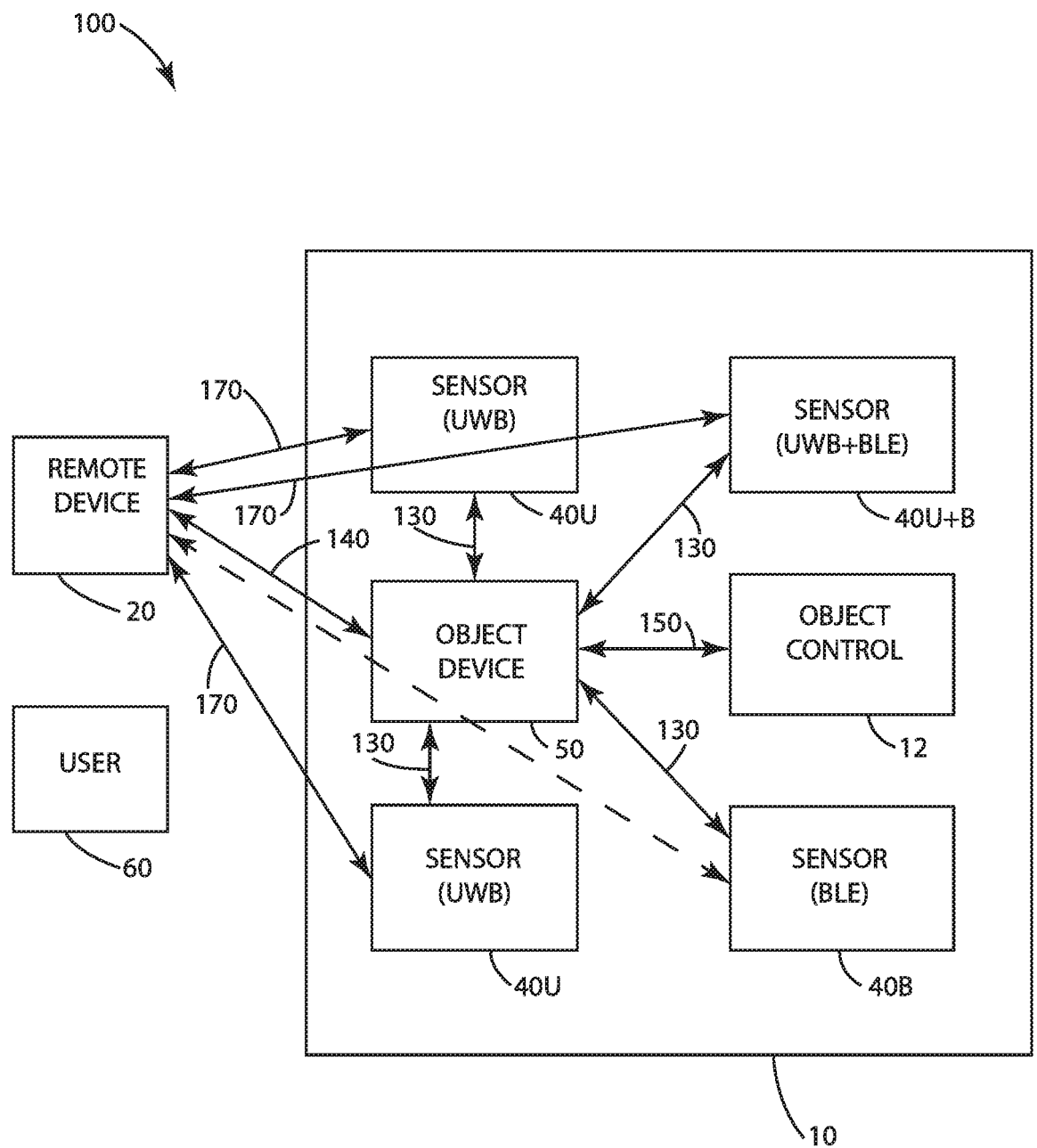
FIG. 14 shows a system in accordance with one embodiment of the present disclosure.

For instance, an alternative configuration of the system 100 is shown in the illustrated embodiment of FIG. 14. The system 100 may include a remote device 20, a user 60, and an object 10, similar to the system described in conjunction with FIG. 1. The object 10 in accordance with one embodiment may include an object device 50, an object control 12, and a plurality of sensors, which may be similar to the sensors 40 described herein.

In the illustrated embodiment, the remote device 20 may include both Ultra Wide Band (UWB) and BTLE communication capabilities. For instance, the remote device 20 may be a portable device in the form of a smartphone with both UWB and BLE radios.

The system 100 in the illustrated embodiment of FIG. 14 may include one or more sensors 40 (which may also be described as anchors) that are disposed on the object 10. The one or more sensors 40 may be disposed in a variety of positions on the object 10, such as the positions described herein, including for instance, one or more sensors 40 in the door panel and one or more other sensors in the B pillar, as shown and described in connection with FIG. 2.

One or more of the sensors 40 may be operable to communicate via at least one communication link according to a communication protocol. The communication link may be established via one or more channels. As described in connection with FIGS. 1-2, the sensor 40 may be operable to communicate by sniffing or receiving communications via at least one communication link 140 established between the object device 50 and the portable device 20, such that the sensor 40 does not transmit communications via the communication link 140. This type of communication for the sensor 40 is shown in phantom lines in FIG. 14.

However, one or more sensors 40 in the system 100 of FIG. 14 may be operable to communicate by transmitting and receiving communications via at least one communication link 170 established directly with the remote device 20. In this way, the sensor 40 may directly communicate with the remote device 20. The at least one communication link 170 may include communications according to more than one protocol (e.g., BTLE and UWB).

The one or more sensors 40 of the system 100 in the illustrated embodiment of FIG. 14 may be operable to a) sniff communications with respect to the communication link 140 between the remote device 20 and the object device 50, orb) directly communicate with the remote device 20 via the at least one communication link 170. The communication capabilities of the one or more sensors 40 in the illustrated embodiment is identified in the figure and by a letter designation U for UWB and B or BTLE. For example, the sensor 40U is an ultra-wideband anchor responsive to UWB signals; sensor 40U+B is responsive to both UWB and BTLE communications; and sensor 40B is a BTLE anchor.

It is to be understood that an object 10, such as a vehicle, may include more sensors 40 than shown in the illustrated embodiment of FIG. 14. Depending on the implementation, some number of anchors may be integrated in a vehicle. For instance, 3 to 10 anchors with both UWB and BTLE capabilities may be provided.

In one embodiment, UWB, similar to BTLE, is a standardized communication protocol (see IEEE 802.15.4a/z). One way in which UWB may differ from BTLE is with respect to ranging applications. UWB may involve transmitting short duration pulses that allow for time-of-flight functions to be used to determine the range from the remote device 20 to one or more sensors 40U, 40U+B (e.g., anchors). Then the object device 50 may use a lateration function and/or a multilateration function to determine localization with respect to the remote device 20 (e.g., the location of the remote device 20 relative to the object 10). Lateration and/or multilateration may involve processing a set of ranges from the remote device 20 to each sensor 40 to output a position estimate of the portable device 10 relative to the object 10). The remote device 20 and the UWB-enabled sensors 40U, 4OUB may transmit and receive packets of data back-and-forth, enabling a time-of-flight determination with respect to such communications.

The system 100 in the illustrated embodiment of FIG. 14 may include at least two different communication links for determining localization. For instance, the communication link 140 may utilize BTLE-based localization, and the communication link 170 may utilize UWB-based localization. In the illustrated embodiment, the communication link 170 is designated with respect to each of the sensors 40U, 40U+B; however, it is to be understood that each of these communication links 170 may not be the same. For instance, each of the communication links 170 may be separate (e.g., a separate channel or band).

Utilizing multiple communication links for localization may provide a number of benefits.

For instance, in a configuration in which both BTLE and UWB information are obtained, this information can be combined to enhance and stabilize a localization estimate. The BTLE and UWB channels used in the localization may involve different frequencies, and the signal characteristics to be exploited for ranging are different (RSSI for BTLE and time-of-flight for UWB).

RSSI ranging calibration may be augmented or supplemented with time-of-flight from UWB communications. This augmentation or supplemental use of time-of-flight may be conducted in real-time by the system 100, or conducted in a manner to adapt a model that uses sensed information not based on UWB communications (e.g., only sensed information with respect to BTLE communications).

For instance, one embodiment according to the present disclosure may be directed toward calibrating out variance of RSSI or range calculations. BTLE+UWB capable portable devices 20 may be tested to build up a map of BTLE communication characteristics, UWB communication characteristics, and ranging or localization data. A BTLE-only remote device 20 may be operable to process such maps but without UWB communications characteristics to refine RSSI-only range estimates. For instance, the locator 210 may be based on both BTLE+UWB communication characteristics; however, in practice, the locator 210 may generate location information based on BTLE communication characteristics without the UWB communication characteristics. Alternatively, the locator 210 may be based on BTLE communication characteristics, and may be operable in practice to generate location information based on both UWB and BTLE communication characteristics. It is to be understood that BTLE or UWB, or both, may be replaced with another type of communication protocol.

The remote device 20, in one embodiment, can establish a direct communication link 170 with one or more of the sensors 40U, 40U+B, and the one or more signal characteristics (e.g., time-of-flight) may be determined based on this direct communication link 170.

As described herein, one or more signal characteristics, such as signal strength, time of arrival, time of flight, and angle of arrival, may be analyzed to determine location information about the remote device 20 relative to the object 10, an aspect of the object 10, or the object device 50, or a combination thereof. For instance, time difference of arrival or the angle of arrival, or both, among the sensors 40 and the object device 50 may be processed to determine a relative position of the remote device 20. The positions of the one or more antenna arrays 30 relative to the object device 50 may be known so that the relative position of the remote device 20 can be translated to an absolute position with respect to the antenna arrays 30 and the object device 50.

Additional or alternative examples of signal characteristics may be obtained to facilitate determining position according to one or more algorithms, including a distance function, trilateration function, a triangulation function, a lateration function, a multilateration function, a fingerprinting function, a differential function, a time of flight function, a time of arrival function, a time difference of arrival function, an angle of departure function, a geometric function, etc., or any combination thereof.

The system in one embodiment may facilitate conducting tests in different environments. For instance, the system for automatically moving the portable device relative to an object may be assembled on site for a particular environment.

II. Locator Calibration

The system 100 in the illustrated embodiment of FIGS. 1-4 may be configured to tune a locator 210 for determining location information with respect to a test device 200 relative to the object 10, for which an object device 50 is disposed in a fixed relationship. The test device 200 may be a type of remote device 20. In an alternative embodiment, the test device 200 may be a sensor 40, and the locator may be determined in conjunction with the sensor 40 and the object device 50.

Figure 4:
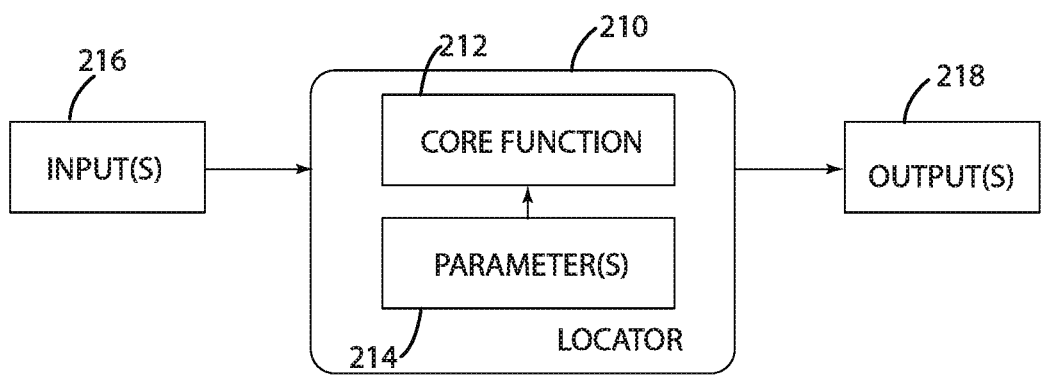
FIG. 4 shows a locator of the system in accordance with one embodiment.

In the illustrated embodiment of FIG. 4, the locator 200 may be based on a locator algorithm 212 that is configured to receive one or more inputs based on communications with the tester device 200 and to generate one or more outputs indicative of a location of the tester device 200 relative to the object 10. The one or more inputs may be one or more signal characteristics of the communications, as described herein, such as signal strength (e.g., RSSI), AOA, and TOF. The one or more inputs may be sensed in the object device 50 and one or more sensors 40, which may be disposed at various locations relative to the object 10. As an example, the one or more inputs may include a signal strength sensed by the object device 50 with respect to the communications and a signal strength sensed by each of the one or more sensors 40 with respect to the communications.

The locator algorithm 212 of the reference locator 210 may be tunable according to a plurality of parameters 214 of the reference locator 210. Example parameters include the following: sensor offsets (e.g., RSSI or AOA offsets, or both), zone offsets (e.g., thresholds and hysteresis parameters), and distance conversion (e.g., constants or equations, or both). Based on the one or more inputs 216 and the values of the plurality of parameters 214, the locator function 212 may provide an output 218 indicative of a location of the test device 200 relative to the object 10. The locator algorithm 212 may vary from application to application.

Figure 13:
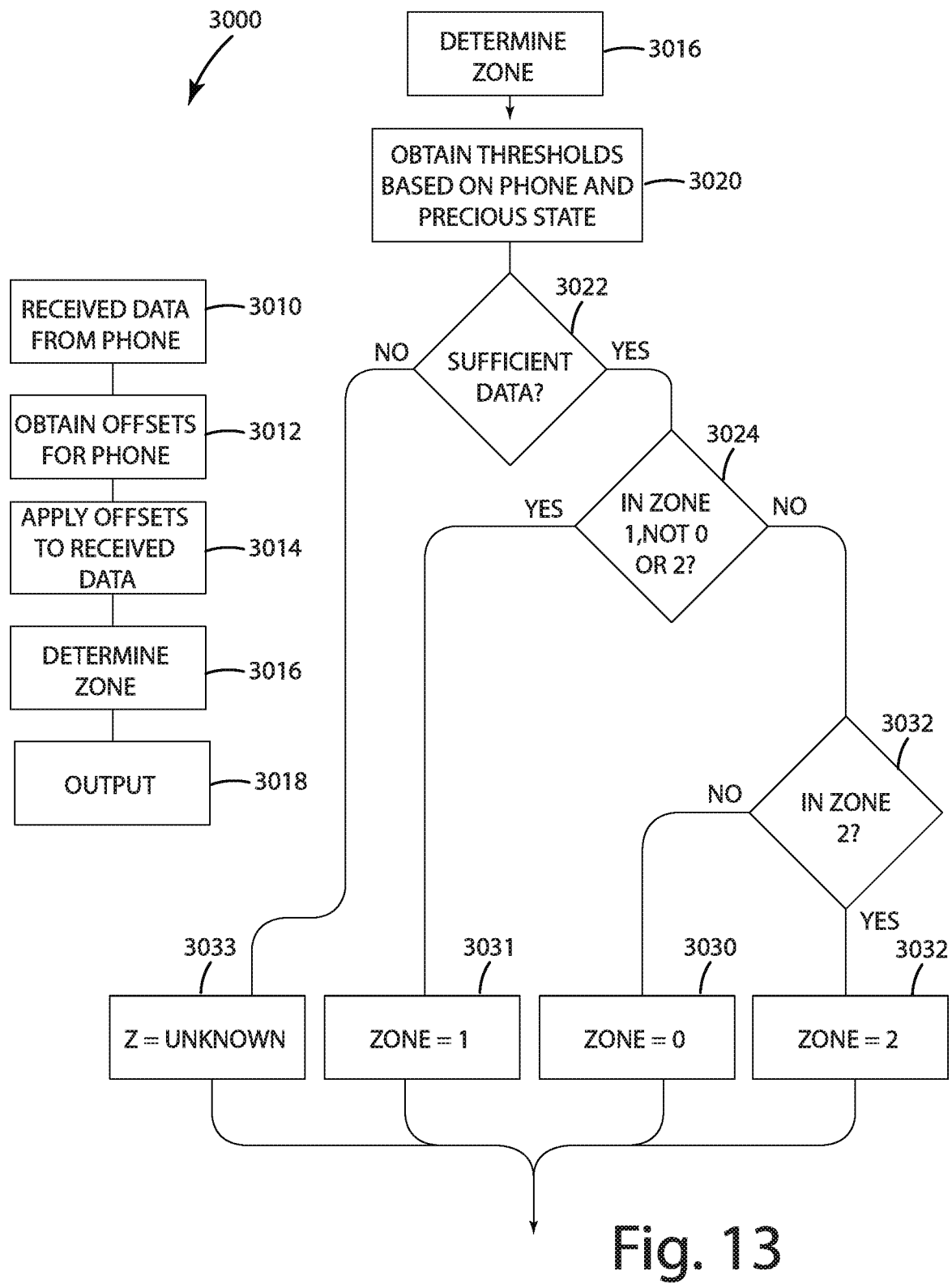
FIG. 13 depicts a method of determining location for a locator in accordance with one embodiment.

An method of determining location in accordance with one embodiment of the locator algorithm 212 is depicted in FIG. 13 and generally designated 3000. The method of FIG. 13 may include receiving data from the device or inputs 216, obtaining offsets for the device (e.g., reference locator and/or adaptor locator offsets), applying the offsets to the received data, and determine the zone as an output 218. Steps 3010, 3012, 3014, 3016, 3018. The zone determination may include obtaining one or more thresholds based on the type of device and a previous state, which, as an example, may be previous zone determination. Step 3020. The method may include determining if there is sufficient data, and if not generating an output indicative of the zone being unknown. Step 3022, 3033. If there is sufficient data, the locator may determine, based on the data, the thresholds, the offsets, variability indicators, hysteresis settings, or another parameter or measurement, or any combination thereof, if the device is located in zone 1 (e.g., inside) and not zone 0 (e.g., far away) or 2 (e.g., near). Step 3024, Step 3031. An alternative set of zones may be driver side (0), inside (1) or passenger side (2)—although it should be understood the present disclosure is not so limited. Based on a similar determination to Step 3024, the locator may determine if the device is in zone 2, and if so, provide an output accordingly. Steps 3026, 3032. If the device is determined not to be in zone 2, the locator may output that the device is in zone 0. Step 3026, 3030.

Based on the one or more inputs and the values of the plurality of parameters 214, the locator algorithm 212 may provide an output indicative of a location of the tester device 200 relative to the object 10. The locator algorithm 212 may vary from application to application.

In one embodiment, the locator algorithm 212 may be a neural network (e.g., a convolutional neural network with one or more layers), and the one or more parameters may include weights of nodes within the neural network. As described herein, the weights may be adjusted during training of the locator 210 with samples obtained for the tester device 200 and the object 10 and truth information obtained with respect to the samples. As discussed herein, the truth information may be obtained with respect to a controlled position of the test device 200 including a position in three-dimensional space and an angular orientation at that position.

In one embodiment, the locator 210 may be trained in conjunction with a system 100 configured for Bluetooth communication, more particularly Bluetooth Low Energy (BLE) communications. The BLE specification allows transmitters (e.g., a phone) to change the power at which it transmits (its "transmit power"). For a receiver to compute a distance to a transmitter using a signal strength or RSSI (e.g., using Frii's transmission equation), or to adjust an RSSI measurement to normalize measurements at different transmit powers, the receiver also accounts for the transmit power of the transmitter. The terms receiver and transmitter are used to describe communications in accordance with one embodiment. It should be understood a device, such as the object device 50, sensor 40 or the test device 200, or a combination thereof, may operate as a receiver or a transmitter, or both.

In the context of BLE Advertising, when advertising, the transmitter (e.g., a BLE Peripheral, such as a phone, a fob, etc.) is able to control, and communicate as part of the advertisement message, the transmit power. In other words, in a system that measures the RSSI of advertisement messages from an advertising remote device 20, the remote device 20 may communicate transmit power to the system 100, including to one or more object devices 50 or one or more sensors 40, or a combination thereof, forming one or more object receivers (e.g., a vehicle receiver[s]).

Turning to a BLE Data Connection, the transmit power used when advertising may be different from the transmit power used during a data connection. The system 100 may microlocate, or determine location information about the remote device 20 relative to the object 10, using BLE by measuring the RSSI of data messages to mitigate fast fading and other sources of transmit power variation (as described herein) and RF congestion by operating across the thirty-seven data channels defined within the BLE protocol (as opposed to just one advertising channel).

During a data connection, the system 100 configured for BLE may allow either the Central (e.g., the object device 50) or the Peripheral (e.g., the remote device 20) to change its transmit power. Transmit power may not be communicated as part of a BLE data packet; therefore, in the system 100, where one or more receivers disposed on the object 10 (such as the object device 50 and the sensors 40) measure the RSSI of data messages transmitted from the remote device 20, the one or more receivers may not be aware of the remote device's transmit power, unless the remote device 20 includes this information in the content of a message (or the one or more receivers are able to query a service on the remote device 20 to obtain it).

The system 100 configured for BLE in one embodiment can implement a transmit power service that may be queried to obtain the current transmit power during a connection; however, some remote devices 20 may not be configured for such a service. For instance, conventional iOS and Android phones do not implement this service, nor do they provide access to the current transmit power when connected via operating system Application Programming Interfaces (APIs) to include in a message payload. Some conventional phones use a fixed (constant) transmit power during connections, and thus, the RSSI offset obtained during calibration can encapsulate the phone's data transmit power. The transmit power service is not provided in this context, because transmit power does not vary substantially during a connection. It is noted that it is considered unlikely that phone manufacturers will alter this conventional behavior without providing a mechanism to obtain it, due to the large number of products in the market that rely upon it. Regardless, if the transit power is varied in a remote device 20, a transfer power service may be implemented to obtain the transmit power being utilized.

The system 100 may experience variations in the transmitter to receiver for a variety of reasons. For instance, variation in power from a transmitter to a receiver in one embodiment is a function one or more of, but not limited to, the following:

Heading in attitude coordinates (heading [or yaw], pitch, roll), measured at the transmitter, of the line going toward the receiver. This is due primarily to antenna gain pattern and polarization pattern.

Heading in heading coordinates (heading, pitch, roll), measured at the receiver, going toward the transmitter. This is also due primarily to antenna gain pattern and polarization pattern.

Frequency variation in antenna gain at the transmitter and at the receiver.

Attenuation due to objects that are in the path between the devices.

Attenuation due to objects that are in the near field of the antenna (e.g., hands, purses, etc.) that detune the antenna.

Objects that reflect and channel power (e.g., nearby walls, ceilings, cars, etc.). Some of these objects may move (e.g., car doors, garage doors, etc.).

Fast fading, or spikes, at specific frequencies at specific narrow locations due to reflections off objects causing destructive, or constructive, interference, respectively.

Diffraction as RF bends around objects.

As described herein, the signal strength (RSSI) at the receiver is dependent upon the orientation of the transmitter (e.g., the remote device 20) relative to an antenna of the receiver (e.g., the object device 50 or the sensor 40, or both). The orientation may vary in angle and polarization relative to the antenna of the receiver in addition to its distance, and attenuators/reflectors in and around the antenna (e.g., a vehicle shell, materials nearby to the antenna [including its ground plane and wiring], etc.). In other words, while it is possible to determine the RSSI for a transmitter in a particular orientation and distance relative to a well-known antenna external from the vehicle (e.g., on a sensor module in a controlled setting), the characteristics of each antenna may be altered by packaging, location, and orientation of the antenna in the vehicle or other type of object.

In a vehicle, there may be many antennas in accordance with one embodiment of the system 100, where each of the antennas may be in a different location with a different orientation. All or a subset of the antennas and associated devices, such as the object device 50 or the sensor 40, may obtain RSSI measurements simultaneously.

Because a variety of factors can affect one or more signal characteristics of communications between the receiver and transmitter, to facilitate tuning the locator 210 and the locator algorithm 212, samples may be obtained for the one or more signal characteristics under a variety of conditions. Example variations in conditions can include purposefully rotating the remote device 20 in all directions, as well as obtaining test samples at different heights to ground, to force testing or obtaining samples to cover a large percentage of all possible angles/orientations.

In one embodiment, the locator 210 may be tuned such that one or more inputs from each sensor 40 of the system 100 may be associated with an offset for the test device 200, or for each type of remote device 20 (e.g., each type of phone, at the cost of maintaining offsets for each type of phone). In one embodiment, because antenna performance may vary by frequency (channel), the system 100 may include a reference model (e.g., a base version of the locator 210) with an offset for each sensor 40 at each frequency with each type of remote device 20. For purposes of disclosure, however, an offset described herein is a global offset, but it should be understood the present disclosure is not so limited and that several offsets or tuning parameters may be utilized in conjunction with inputs obtained from the parts of the system 100, such as one or more sensors 40 and obtained under various circumstances, such as at different reception or transmission frequencies.

In one embodiment, different types of remote devices 20 may have different antenna radiation properties due to its antenna design(s), antenna gain(s), remote device construction(s), antenna placement(s), and whether or not a user is holding the remote device 20 (and where the user is holding the remote device). Given the variations in and number of possible conditions, including the possible changes in these conditions in real time, an offset or tuning parameter is used in one embodiment as an approximation. Alternatively, testing may be conducted with all or a subset of conditions and additional parameters may be utilized to tune the reference locator 210 accordingly. The offset or tuning parameter may represent an approximation and may be considered an average across orientations, placement, and other conditions. These test conditions may be conducted in a repeatable manner so that samples may be obtained for the same conditions for each type of remote device 20, including the test device 200.

Due to the variety of conditions and possible variations in real time, as well as the complexities of radio communication at high frequencies, such as 2.4 GHz for BLE, a user is unlikely to be able to tune a locator algorithm of the system 100 to operate with their remote device 20 to yield accurate and repeatable results. A user in the field is unlikely to be positioned to control a test environment. As a result, as described herein, the locator 210 may be trained or tuned in a controlled setting and then later provided to the object device 50 or remote device 20 of the user, or both, for use in the field. The locator 210 may be tuned for the locator function for each type of remote device 20, or alternatively, an adapter locator may be tuned for each type of remote device 20 in conjunction with a reference locator for a reference type of remote device 20 or test device 200.

III. System and Method for Obtaining Truth Information

Figure 5:
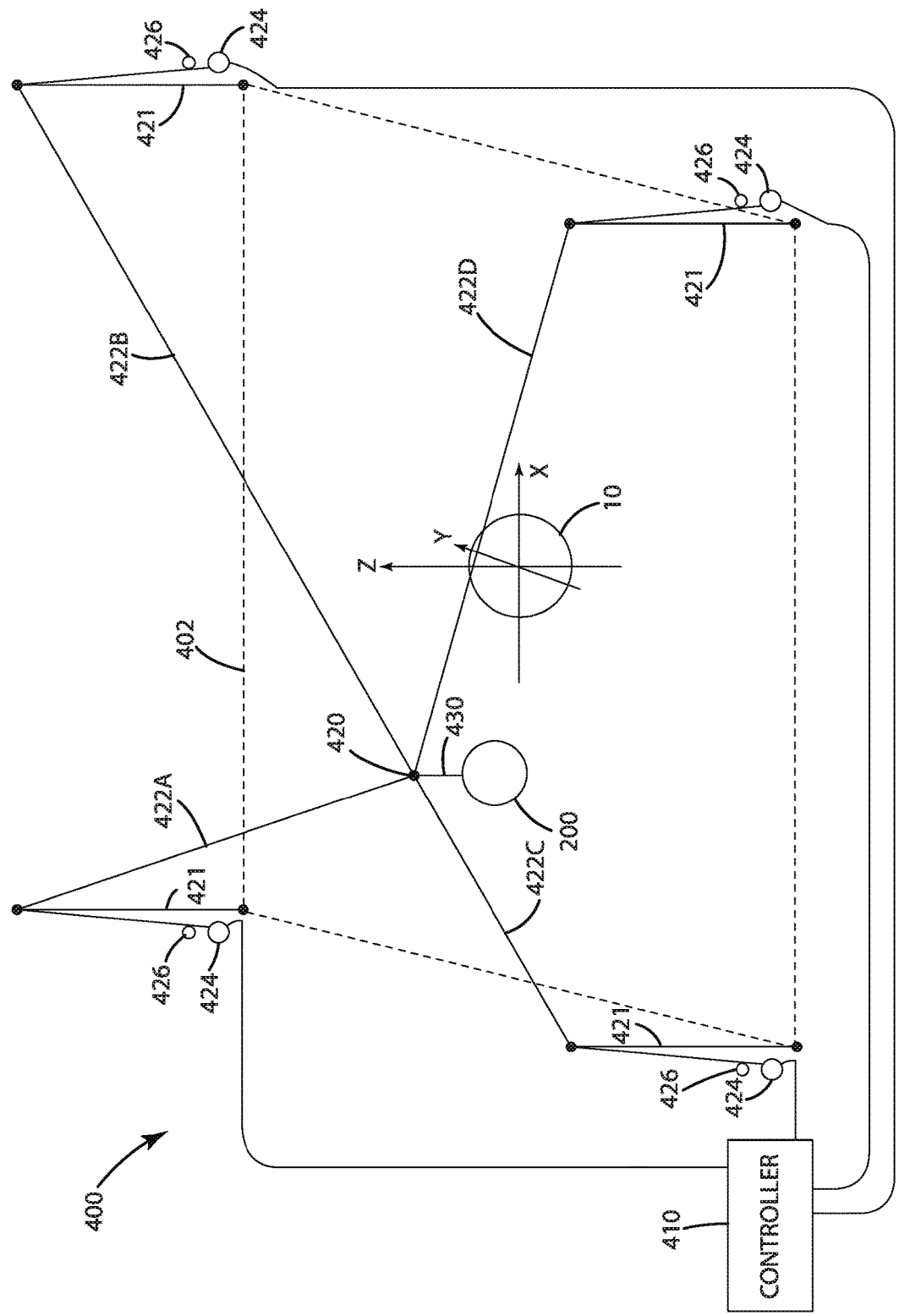
FIG. 5 depicts a calibration system in accordance with one embodiment.

A system for obtaining truth data or information with respect to a test device 200 and an object 10 in accordance with one embodiment is shown in FIG. 5 and generally designated 400. The test device 200 in the illustrated embodiment is a type of remote device 20. The system 400 in the illustrated embodiment may include a suspension system for supporting and moving the test device 200 in three-dimensional space at one or more angular orientations. It is noted the present disclosure is not so limited. For instance, in an alternative embodiment, the system 400 may include an automated vehicle capable of supporting and moving the test device 200 in three-dimensional space at the one or more angular orientations.

The system 400 may include a control system 410 configured to control operation of the system 400, including positioning of the test device 200 relative to the object 10 in three-dimensional space. For instance, the control system 410 may be configured to automatically direct a path of the test device 200 in accordance with a predefined path. The predefined path may correspond to a plurality of points in three-dimensional space that are spaced apart. The points may be spaced apart equally. Alternatively, the points may be spaced as a function of proximity to the object 10 (e.g., the closer to the object 10, the more closely spaced the points.) This way, truth information (e.g., a position and sensor information with respect to communications from the test device 200) may be obtained in a consistent manner for different types of objects 10 and different types of test devices 200. An example point in a test path includes the following: t=0, sequence=1, position X=0, position Y=0, elevation=6, angle 1=90 deg., angle 2=0, actual zone=A, actual AOA={60 deg, 60 deg, 40 deg}, environment=inside garage The example point is illustrative that a state of the object may be recorded during a test. It should be understood that the examples provided are not the only states that may be recorded. Example states include a location or environment of the object and a configuration of the object, such as whether a door of the object is open or closed. The state information may form part of the truth data that facilitates testing of the system and training a locator.

An example sample point for this test point includes the following: Observed readings={−60 dB, −62 dB, −80 dB}, computed zone=A, observed AOA={60 deg, 60 deg, 45 deg}, computed position X=0, computed position Y=0, computed elevation=10, computed environment=inside.

The data for the test point and the sample point may be correlated in a number of ways, such as by time or by actual knowledge of the test point parameters at the time the sample point is obtained.

In one embodiment, the path of the test device 200 may be dynamic, based on feedback from a training algorithm. For instance, if the training algorithm determines that output from the locator 210 for a particular region relative to the vehicle is less than a threshold degree of confidence, the control system 410 of the system 400 may position the test device 200 at a plurality of more closely spaced positions within this region (relative to the predefined path) in an effort to enhance accuracy for the locator 210 for this region with a greater number of associated samples of truth data.

Additionally, the control system 410 may be configured to direct the system 400 to change or set an angular orientation of the test device 200. The angular orientation may be defined in accordance with Euler angles for roll ($\varphi$), pitch ($\theta$), and yaw ($\psi$). Alternatively, the angular orientation may be defined according to a normalized quaternion. The Euler angles or the quaternion may be determined relative to a reference coordinate frame (e.g., North, East, Down (NED) convention). By changing the angular orientation of the test device 200 at a position, multiple samples of truth information may be obtained at that position. This way, the locator 210 may be trained based on truth information for a variety of circumstances that may occur in use, such as various types of orientations that the user 60 carries the remote device 20, thereby enhancing the degree of confidence for the locator 210 providing an accurate output corresponding to the actual location of the portable device 210.

In the illustrated embodiment, the system 400 includes a plurality of flexible members 422A-D coupled to a main body 420 and supported vertically by a plurality of posts 421. The length of each of the plurality of flexible members 422A-D may be varied to control a position of the main body 420 in three-dimensional space. For instance, in the illustrated embodiment, by decreasing the length of the flexible member 422A while maintaining the lengths of the flexible members 422B-D, the position of the main body 420 may be changed. That is, decreasing the length of the flexible member 422A in this example would increase the elevation of the main body 420 and reduce the distance between the main body 420 and the support 421 of the flexible member 422A, thereby changing the X, Y, Z position of the main body 420. Conversely, increasing the length of the flexible member 422B-D may decrease the elevation of the main body 420 and increase the distance between the main body 420 and the support 421 of the flexible member 422A, changing the X, Y, Z position of the main body 420.

The lengths of the plurality of flexible members 422A-D may be varied in a variety of ways. In the illustrated embodiment, each flexible member is coupled to a motor assembly 424 at an end opposite the end coupled to the main body 420. The motor assembly 424 may be configured to reel and unreel the flexible member on a pulley in accordance with a drive signal provided by the controller 410. By winding and unwinding the flexible member 422A-D on the drum or pulley, the motor assembly 424 respectively decreases and increases the length of the flexible member 422A-D. Each of the plurality of flexible members 422A-B may be configured to interface with an idler pulley 426 that is coupled to a sensor (e.g., an encoder) configured to provide feedback indicative of a length of the flexible member 422A-D, or a change in length of the flexible member 422A-D. Based on this feedback, the controller 410 may control the motor assemblies 424 to position the main body 420 and test device 200 at a target X, Y, Z position.

In the illustrated embodiment, the flexible members 422A-D and associated supports 421 are configured to position the main body 420 and the test device 200 at a target X, Y, Z position within a test area 402 in which the object is disposed. The object 10 may remain stationary for the duration of a test cycle to obtain a plurality of samples of truth information. In one embodiment, aspects of the object 10 may be staged or changed during portions of the test cycle (e.g., doors, windows, or the trunk, or a combination thereof may be opened or closed).

Figure 6:
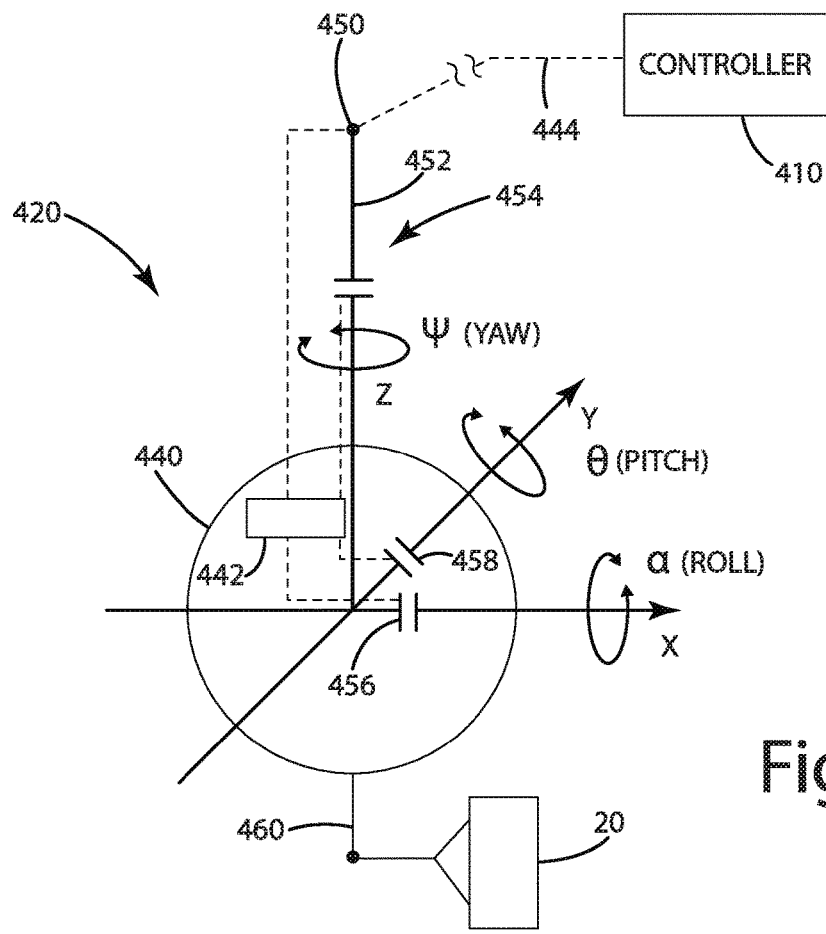
FIG. 6 shows a portion of the calibration system of FIG. 5.

In the illustrated embodiment of FIG. 6, the main body 420 is depicted in further detail. The main body 420 includes a common mount 450 for attachment to each of the plurality of flexible members 422A-D and a coupler 452 to connect a gimbal 440 to the common mount 450. The gimbal 440 may be configured to control an angular orientation of a portable device coupler 460, which may be configured to hold the test device 200. The portable device coupler 460 may vary from application to application or for different test parameters. For instance, the portable device coupler 460 may be configured to mimic a human hand holding the test device 200 in a particular manner. As another example, the portable device coupler 460 may be similar to a bag or other implement in which the test device 200 may be placed.

A gimbal controller 442 of the gimbal 440 may be communicatively coupled to the controller 410 via a communication link 444. The communication link 444 may be wireless or wired, such as by a control signal line embedded in one of the flexible members 422A-D. Based on a command from the controller 410, the gimbal controller 442 may control operation of a yaw drive unit 454, a pitch drive unit 456, and a roll drive unit 458 configured to vary an angular orientation of the portable device coupler 460 as well as the test device 200. For instance, the controller 410 may direct the gimbal controller 442 to set a yaw of the test device 200 to 0° or due North from a yaw angle of 15°. The gimbal controller 442 may provide a drive signal to the yaw drive unit 454 to change the yaw angle accordingly.

Figure 7:
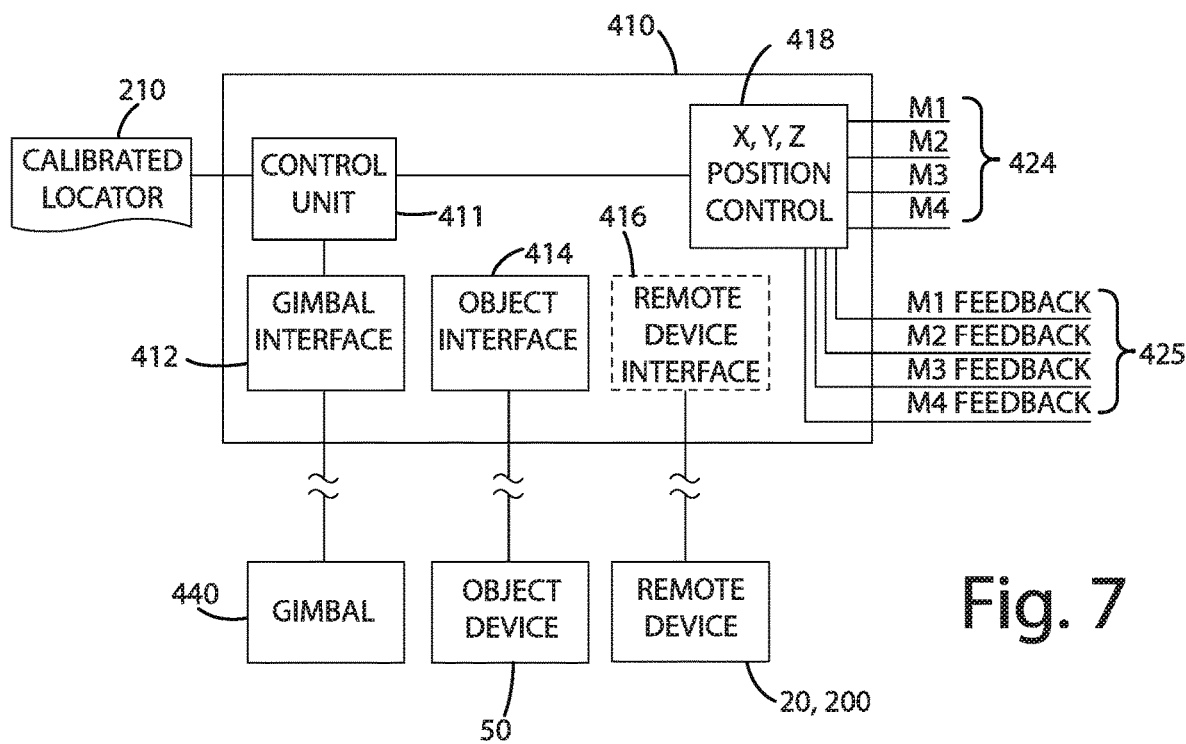
FIG. 7 shows a controller of a calibration system in accordance with one embodiment.

The controller 410 of the system 100 is shown in further detail in the illustrated embodiment of FIG. 7. The controller 410 may be configured similar to a system component described herein, including, for instance, one or more processors 51, one or more memory units 52, and one or more communication interfaces 53. In the illustrated embodiment, the controller 410 includes several interfaces 53 configured to communicate with the gimbal 440, the object 10 via the object device 50, and optionally the test device 200. Specifically, the controller 410 in the illustrated embodiment includes a gimbal interface 412, an object interface 414, and a remote device interface 416 optionally for communicating with the test device 200. The remote device interface 416 may be optional primarily because, in one embodiment of obtaining truth data for calibration, the remote device 20 or test device 200 may be left to operate independent of the controller 410, similar to how the remote device 20 would operate in use in one embodiment without being aware of a user's intent to move the remote device 20 from one area to another.

The gimbal interface 412 of the controller 410 in the illustrated embodiment may be configured to communicate with the gimbal controller 442 of the gimbal 440 via the communication link 444. In one embodiment, the communication link 444 may be a physical link (e.g., a flexible fiber optic link or wire embedded in one of the flexible members 422). Alternatively, the communication link 444 may be wireless. It is noted that the gimbal 440 may be self-powered (e.g., a battery) or powered via one or more wires embedded in one or more of the flexible members 422.

Through the gimbal interface 412, the controller 410 may direct operation of the gimbal 440 to set or change an angular orientation of the test device 200. As discussed herein, the angular orientation may vary about three axes, pitch, roll, and yaw. The controller 410 in one embodiment may transmit a query to (or receive feedback without transmitting a query to) the gimbal 440 for the current angular orientation of the test device 200. The controller 410 may store the angular orientation of the test device 200 in memory for association with one or more other parameters, states, or sensed characteristics with respect to the test device 200 at a given point or period in time.

In the illustrated embodiment, the object interface 414 of the controller 410 may be configured to communicate with the object device 50 to obtain information pertaining to one or more sensed characteristics of communication received from the test device 200. For instance, the object device 50 may be configurable in a calibration mode in which the object device 50 communicates raw sensor information obtained with respect to communications transmitted from the test device 200. As discussed herein, the object device 50 may be disposed on the object 10 and communicatively coupled to one or more sensors 40. The object device 50 and the one or more sensors 40 may be operable to sense or measure one or more signal characteristics of the communications transmitted from the test device 200. The one or more sensors 40 may be provided connection parameters to enable the one or more sensors 40 to sniff communications transmitted from the test device 200 to the object device 50. This way, the one or more sensors 40 may measure one or more signal characteristics of the communications transmitted from the test device 200 and correlate these one or more measured signal characteristics with a time of measurement. The object device 50 may also measure one or more signal characteristics of communications transmitted from the test device 200.

To provide an example, the object device 50 and the one or more sensors 40 may measure a signal strength of communications transmitted from the test device 200. Because the object device 50 and the one or more sensors 40 may be disposed at different locations on the object 10, these signal strength measurements may differ as a function of the different locations. The object device 50 may transmit the measurements along with a timestamp for the measurements to the controller 410 for generation of truth data used to facilitate training or configuration of the locator 210. The truth data in one embodiment may be based on a signal characteristic, such as time of flight, obtained with respect to UWB communications. Time of flight may be indicative of distance of the test device 200 relative to one or more of the sensors 40. The UWB communications, and associated time of flight characteristic, may be established directly with one or more of the sensors 40 or the object device 50, or any combination thereof. In one embodiment, a signal characteristic obtained with respect to UWB communications may form part of the truth data that is processed along with a true location or true position of the test device 200 relative to the object device 50, or the UWB-based signal characteristic may be provided as an indicative of an actual position of the test device 200 relative to the object for comparison against other sensed characteristics in calibrating and/or training the locator 210. In other words, the UWB-based signal characteristic may aid in calibrating or assisting in calibrating a locator 210 that accepts a BLE-based signal characteristic as an input 216, or the UWB-based signal characteristic may aid in calibrating or assisting in calibrating a locator 210 that accepts BLE-based signal characteristic as an input 216 and the UWB-based signal characteristic as an input 216. The controller 410 may be configured to control operation of the motor assemblies 424 associated with each of the flexible members 422 to position the test device 200 in three-dimensional space in accordance with a calibration routine (e.g., a pre-defined path). For instance, as mentioned herein, the controller 410 may position the test device 200 at a plurality of spaced positions to obtain truth data with respect to each position. Alternatively, the controller 410 may obtain truth information with respect to a motion path of the test device 200—e.g., a plurality of samples may be obtained and correlated in time with respect to communications transmitted from the test device 200 as it traverses a path in motion. In one embodiment, this mode of obtaining truth information may facilitate identifying use cases and associated locations more accurately. For instance, if a test device 200 is likely to move in a particular path toward an area of the object 10, such as toward a door of a vehicle, one or more signal characteristics associated with and potentially indicative of this path may facilitate training the locator 210 to identify a location or predicted location of the test device 200.

The controller 410 in the illustrated embodiment may include a position controller 418 capable of transmitting a command to a motor assembly 424 to wind or unwind a respective flexible member 422 on a pulley (not shown) of the motor assembly 424. The position controller 418 may translate a spatial coordinate in X, Y, Z Cartesian notation relative to an origin within the test area 402. The position controller 418 may be configurable in a calibration mode to change the length of the plurality of flexible members 422 to accurately position the test device 200 at a target spatial coordinate relative to the origin. The calibration mode of the position controller 418 may include positioning the test device 200 at a plurality of known locations and utilizing feedback from a sensor coupled to the idler pulley 426 to determine lengths of the flexible members 422 that correspond to a particular spatial coordinate.

The position controller 418 may utilize sensor feedback 425 from each sensor coupled to an idler pulley 426 to track the lengths or changes in length of a flexible member 422 in response to rotation of a drum of the motor assembly 424, on which the flexible member 422 may be wound or unwound. The sensor feedback 425 may be communicated via a physical link or a wireless link. As an example, the idler pulley 426 may include a rotary encoder configured to provide sensor feedback 425 indicative of an absolute angle of the idler pulley 426 or an incremental change in angle of the idler pulley 426. Examples of rotary encoders include an optical or magnetic-based encoder. Because the diameter of the idler pulley 426 remains substantially constant, rotation of the idler pulley 426 can be translated to a change in displacement of the flexible member 422. Despite winding or unwinding of the flexible member 422 on the pulley (resulting in a change in effective diameter of the pulley), the idler pulley 426 maintains a substantially constant diameter with respect to the flexible member 422, and therefore a change in rotation of the idler pulley 426 can be translated to a displacement of the flexible member 422 over a wide range of lengths for the flexible member 422.

The controller 410 may direct operation of the position controller 418 and the gimbal 440 via the gimbal interface 412 to position the test device 200 at a plurality of positions (e.g., X, Y, Z coordinates and pitch, roll and yaw) within the test space 402. For each of the test positions, the controller 410 may obtain information from the object device 50 via the object interface 414 indicative of one or more sensed characteristics of communication with the test device 200. In one embodiment, the controller 410 may direct the object device 50 or test device 200 to communicate and obtain one or more sensed characteristics of communication transmitted from the test device 200. In an alternative embodiment, the test device 200 may not be a remote device 20—instead the test device 200 may be a sensor 40 disposed on the object 10 and the calibration procedure may pertain to identifying a relationship between a known location of the sensor 40 and one or more sensed characteristics output from the sensor 40.

With information pertaining to one or more sensed characteristics of communication for each test position, the controller 410 may develop a set of truth data for the test device 200 in connection with the object 10. This truth data may be stored in memory associated with the control unit 411 and utilized to tune or train the locator 210, as discussed herein. The tuned or trained locator 210 may be stored in or communicated to another device, or a combination thereof, for use by the object device 50 or another system component to determine a location of a remote device 20 based on one or more sensed characteristics obtained with respect to communications from the remote device 20 by the object device 50 or one or more sensors 40, or a combination thereof.

A method in accordance with one embodiment of the present disclosure involves obtaining test samples and truth information with respect to a test device 200 and the system 100, including an object device 50 and a plurality of sensors 40. Each of the sensors 40 may measure one or more signal characteristics of communications between the object device 50 and the test device 200 to form a plurality of test samples. Additionally, the method may involve obtaining truth information for each test sample. The truth information may include an actual location of the test device 200 relative to the object 10 or other information, or a combination thereof. The actual location of the test device 200 may be known by the controller 410, and changed by the controller 410 in accordance with a calibration path.

The determination of one or more specific values (i.e., RSSI offsets, variability indicators, etc.) or samples for the test device 200 may be conducted in a repeatable, controlled manner via the system 400. This may facilitate calibrating the test device 200, and portable devices 20 similar to the test device 200, for use with an object 10, such as a type of vehicle.

When the locator 210 is calibrated or trained for a vehicle using the test device 200, the calibration of the locator 210 may be tested using a procedure and scored—i.e., the locator 210 after training may be validated to determine it operates to yield one or more outputs substantially similar to the truth data under a variety of conditions within an acceptable degree of confidence. If the score is determined to be inadequate during validation, training or calibration of the locator 210 may be updated until the locator 200 is acceptably scored. Given this framework, a method according to one embodiment may be conducted in a manner:

a) That the vehicle calibration test environment is controlled in some way;
 b) That the vehicle calibration test procedure is repeatable; and
 c) That a scoring system or validation system exists for the vehicle calibration test results.

With regard to (a), in the illustrated embodiment, it is not necessary for the test environment to be a vacuum, rather, the test environment may be configured to be consistent for each procedure that is executed (e.g., an open field, in a particular lab, in a parking lot in a particular configuration, etc.) to yield one or more samples.

With regard to (b), repeatable in this sense means not just the steps, but also in the way the steps are performed and the positions and orientations in which the device is held. This may be implemented by an embodiment of the system 400, which may be portable such that the posts 421 and motor assemblies 424 and other associated components may be temporarily installed at a test site or area.

With regard to (c), the scoring system or validation system may be configured for objective results, as opposed to subjective results. An example of such an objective scoring system includes a combination of the percentage of correct classifications and various other metrics (e.g., response time/latency, data stabilization time, etc.).

It should be noted that it may be possible for the locator 210 to learn and dynamically adjust for some environmental characteristics; in which case, environments that may be dynamically compensated for may not be controlled.

Figure 11:
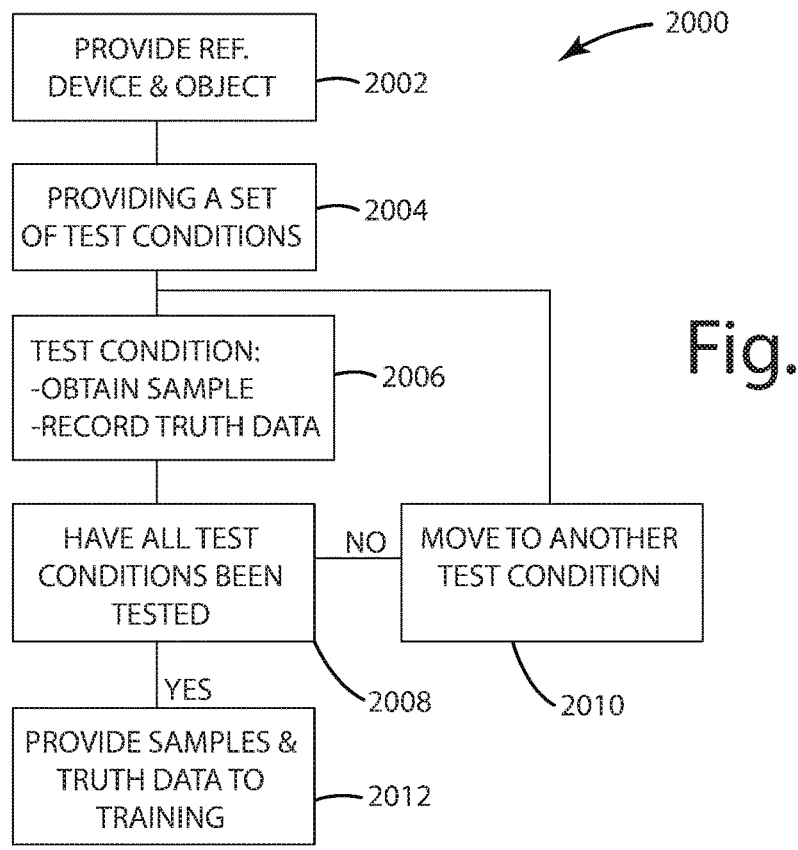
FIG. 11 shows a method of obtaining a training data set in accordance with one embodiment.

A method 2000 of obtaining samples and truth data (b) for training the reference locator 210 is shown in accordance with one embodiment in FIG. 11. The method 2000 may vary from application to application (e.g., for objects being vehicles vs. a building)—however, the method involves obtaining samples of the one or more signal characteristics under a variety of conditions, including, for example, different positions and orientations with respect to the object or various placements of the remote device 20. In one embodiment, coverage of possible conditions may be determined based on use scenarios and whether a use scenario affects the one or more signal characteristics in a meaningful way different from other use scenarios that are tested. As an example, a use scenario in which the remote device 20 is placed in a first type of handbag may be substantially the same as the use scenario in which the remote device 20 is placed in a second type of handbag, which is provided for testing in the method 2000. As a result, the use scenario with the first type of handbag may not be tested.

In one embodiment, the test procedure (b) or the method 2000 may be adapted to test all or substantially all use scenarios identified as being of interest for the method 2000. It should be understood that the present disclosure is not limited to testing all or substantially all use scenarios—a subset of use scenarios may be tested for training the locator 210. In the case where the object 10 is a vehicle, the test procedure may be provided to cover a reasonable number of positions in all or substantially all zones, with the remote device 20 in all orientations and placements (hand, front pocket, back pocket, backpack, purse, etc.).

In the illustrated embodiment, the method 2000 may include providing a test device 200 and the object 10. As discussed herein, the object 10 used in the method 2000 may be a type of test object representative of the type of object 10 for which the locator 210 is trained. Step 2002. The method 2000 may include providing a set of test conditions under which the test device 200 and the object 10 can be tested. Step 2004. These test conditions may correspond to the calibration routine or procedure discussed herein. An example set of test conditions includes the following:

Test locations:
1) 15 m×15 m grid with 1 m spacing with the object 10 centered in the grid;
2) 3 m×3 m grid with 10 cm spacing with the object 10 centered in the grid; and
3) Object interior grid with 10 cm spacing At each test location, positioning the test device 200 with the following height conditions: a) low height (e.g., 0.5 m), b) middle height (e.g., 1.0 m), and c) high height (e.g., 1.5 m). The low, medium and high height conditions may vary depending on the circumstances. For instance, outside the object, such as in the case of the vehicle, the example heights correspond to likely low, medium, and high height conditions. Inside the vehicle, the low, medium, and high height conditions may be different due to the space constraints of the vehicle cabin.

At each test location and height condition, the test device 200 may be disposed in a plurality of orientations. The plurality of orientations may relate to variations in pitch, roll, or yaw (e.g., heading), or a combination thereof.

Figure 12:
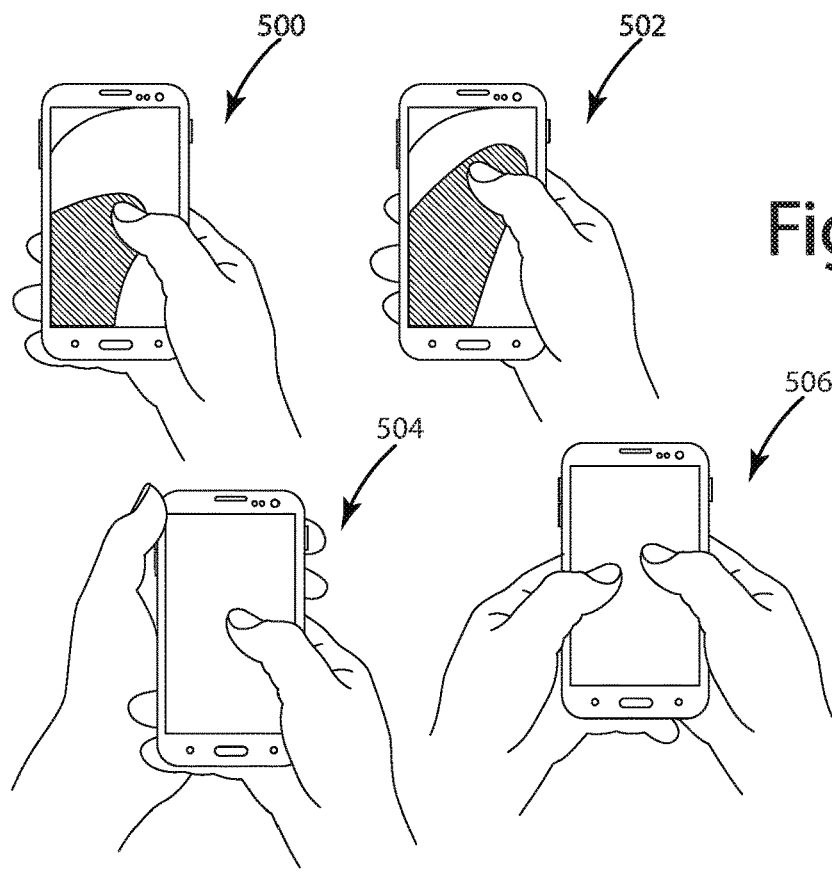
FIG. 12 shows a variety of hand positions for calibration in accordance with one embodiment.

At each test location, height condition, and orientation, the placement of the test device 200 may be varied. Placement may generally relate to the type of holder that is carrying the test device 200 and how the holder is carrying the test device 200. To provide examples, if the type of holder is a human hand (a portable device coupler 460 configured to substantially mimic a human hand), the test device 200 may be held in a normal gripping position, shown in the illustrated embodiment of FIG. 12 and designated 600. The gripping position may be varied based on usage statistics for the type of test device 200. Examples of other gripping positions are also shown in the illustrated embodiment of FIG. 12, including raised gripping position 602 (which is a variant of the normal gripping position), a two-handed gripping position 604 and a variant thereof designated 606. Examples of other holders for the test device 200 include a front pocket, a back pocket, a backpack, or a purse, or a combination thereof.

Under each condition, the test device 200 may be held in place for a period of time such as 10 to 30 seconds. During this time, the system 100 may be configured to obtain a plurality of samples with respect to the one or more signal characteristics described herein. For instance, the object device 50 or the sensor 40, or both, may sense one or more characteristics of communications with the test device 200 under each condition. Example characteristics include signal strength (RSSI), time of flight, and angle of arrival. Steps 2006, 2008, 2010.

It should be noted that the test environment or the conditions set may vary depending on the application. A test procedure that captures substantially all of the conditions identified above may be considered comprehensive for a particular type of test device 200 and object 10. It should be noted that one or more of the identified conditions may be dropped from the conditions set or performed in alternate test procedures or alternative embodiments. The conditions identified for the method 2000 or the test procedure may be selected to capture the performance of the system in a reasonable number of use cases or conditions. Additionally, method 2000 or the test procedure may be used to collect data (as described herein). The collected data may or may not be combined or stored in aggregate, although doing so may facilitate correlation of the collected data among the plurality of test conditions for the test device 200 and the object 10. The collected data may be provided to a training module of the controller 410 in accordance with one embodiment. Step 2012.

The example conditions outlined above are generally static conditions where the test device 200 is positioned and held still for a period of time. It should be noted that the present disclosure is not so limited. Additionally, or alternatively, the conditions used in the method 2000 or the test procedure may be functional tests in which circumstances may be dynamic. Examples of such functional tests include approaches, departures, and zone transitions, or combinations thereof.

IV. Alternative System for Obtaining Truth Information

Figure 8:
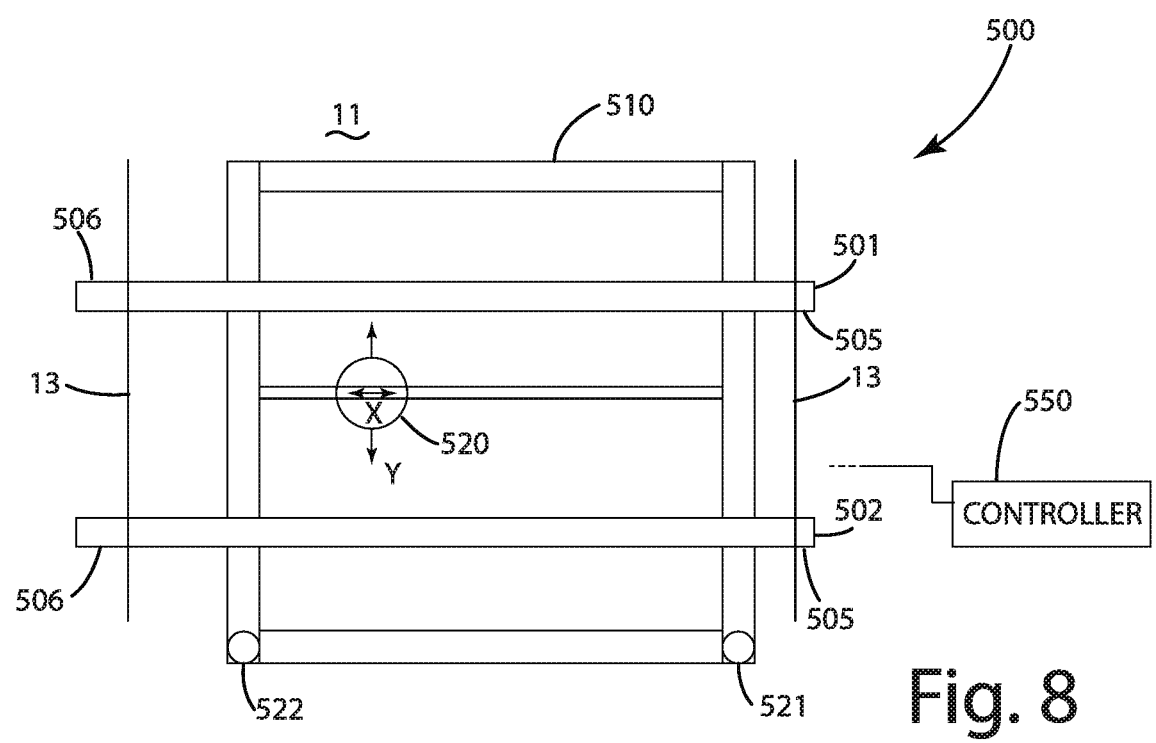
FIG. 8 shows a top view of a calibration system in accordance with one embodiment.
Figure 9:
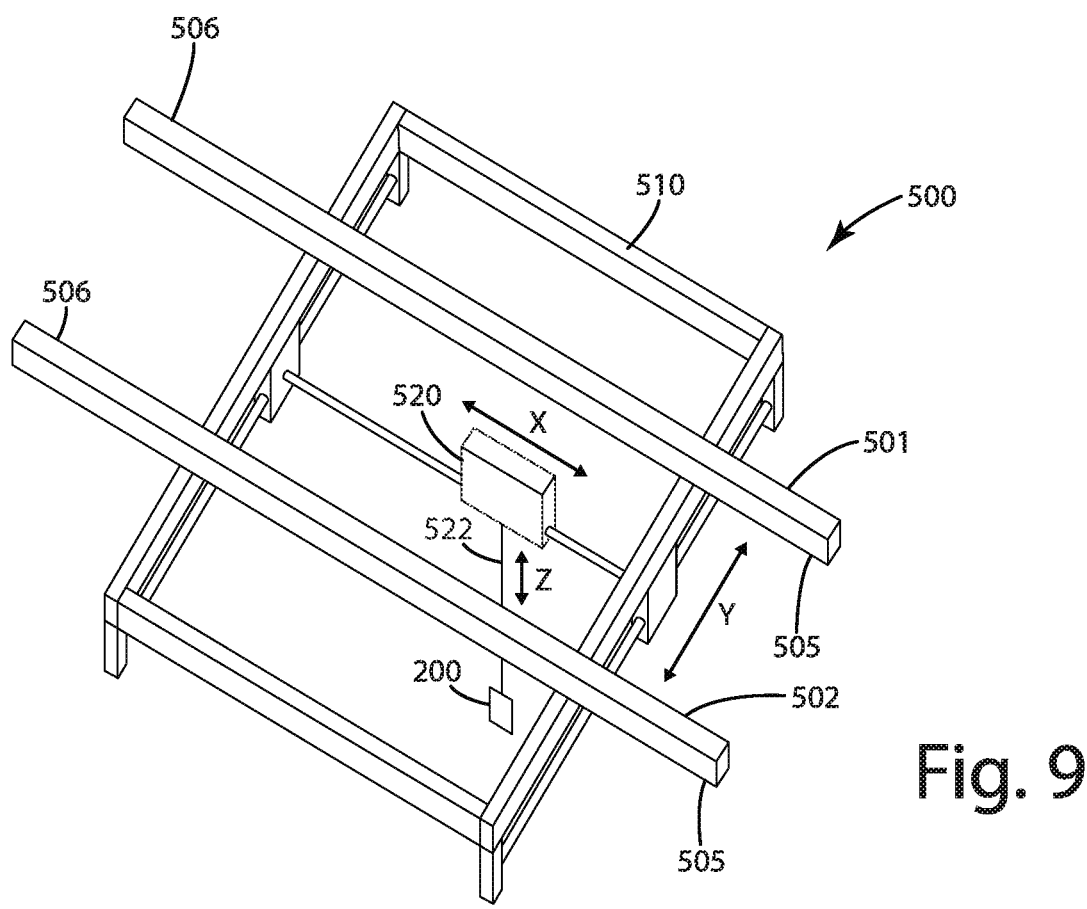
FIG. 9 shows a perspective view of the calibration system of FIG. 8.
Figure 10:
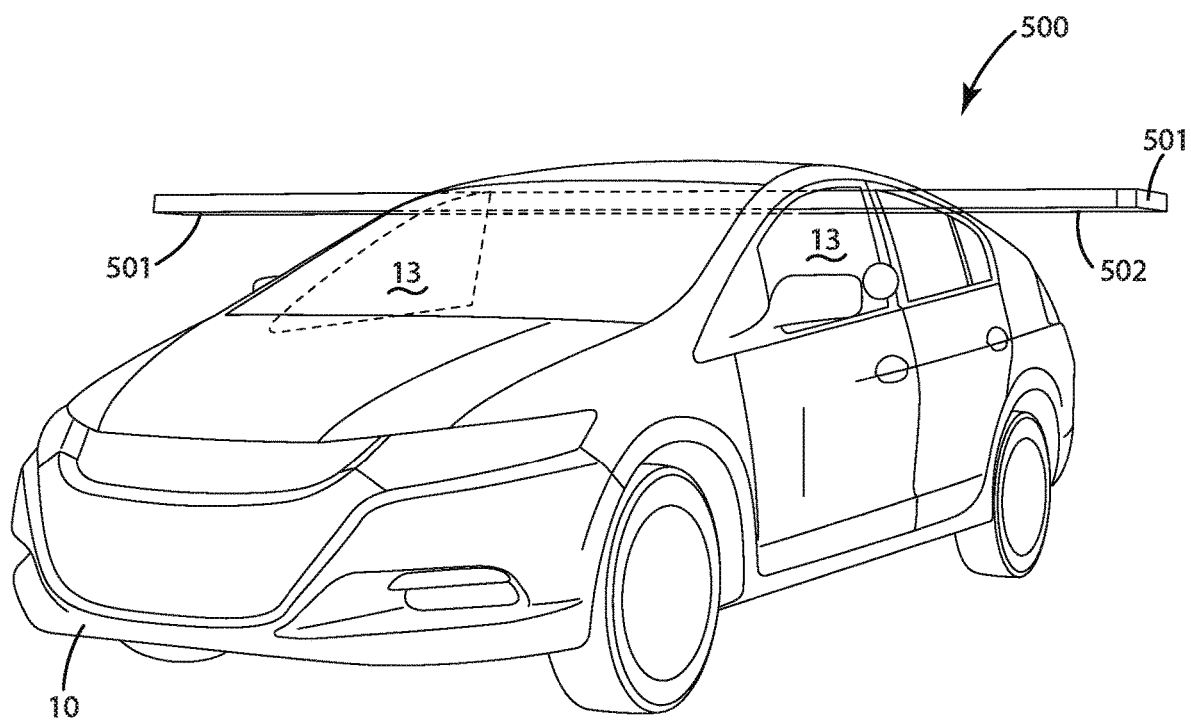
FIG. 10 shows the calibration system of FIG. 8 in conjunction with a vehicle in accordance with one embodiment of the present disclosure.

A system for obtaining truth data or information with respect to a test device 200 and an object 10 in accordance with one embodiment is shown in FIGS. 8-10 and generally designated 500. The system 500 may be configured to obtain truth data similar to the system 400 by positioning a test device 200 to a plurality of locations and optionally a plurality of orientations for each location. The system 500 may be configured to position the test device 500 in an interior space 11 of the object 10, such as a vehicle cabin in the context of the object 10 being a vehicle. The system 500 may be configured to facilitate temporarily disposing one or more portions of the system 500 on the object 10 with little or no modification of the object 10. This way, the system 500 may be configured for calibrating a locator 210 for the object 10 under circumstances similar to those in which the system 500 is no longer present, thereby enhancing a degree of confidence for output of the locator 210.

In the illustrated embodiment, the system 500 is configured for being disposed on a vehicle, but it should be understood that the present disclosure is not so limited. The system 500 may be implemented in conjunction with any type of object 10, including an interior space 11 of a building.

The system 500 may include first and second beams 501, 502 configured to support a frame 510 in the interior space 11 of the object 10. Each of the first and second beams 501, 502 may include first and second ends 505, 506 and a load surface 507 configured to be supported by a portion of the object 10, such as a window 13. Alternatively, the load surface 507 may be supported or suspended by a coupler such as a post that is substantially separate from the object 10. In the illustrated embodiment, by supporting the first and second beams 501, 502 with the windows 13 of the object 10, the first and second beams 501, 502 and frame 510 may be disposed on the object 10 with little effort, allowing the system 500 to be used for testing a test device 200 with several different types of vehicles or objects 10. In one embodiment, the mounting locations for the frame 510 to the first and second beams 501, 502 may be variable to allow the system 500 to be adapted for different object configurations, such as different vehicles with different sized windows or spacing between windows, or both.

The frame 510 may include a movable carriage 520 operably coupled to first and second motor assemblies 522 capable of positioning the movable carriage 520 in two dimensions or according to an X, Y coordinate relative to an origin of the movable carriage 520. In one example, the system 500 may be coupled to a controller 550, which may be substantially similar to the controller 410 except with a position controller configured to direct the movable carriage 520 to an X, Y position within the interior space 11 of the object 10.

The movable carriage 520 in the illustrated embodiment of FIG. 9 may be configured to control an elevation or Z position of the test device 200 relative to the plane defined by the X-Y plane of the movable carriage 520. For instance, the movable carriage 520 may include an actuator 522, such as a scissor actuator or a telescoping actuator, coupled to the test device 200 to enable vertical displacement of the test device 200. The actuator 522 may be configured to extend to a distance corresponding to the Z-position of the test device 200 and to clear obstructions present in the available space beneath the plane defined by the X-Y plane. For instance, the actuator 522 may be configured to avoid hitting passenger and driver seats disposed in a vehicle cabin in traversing from a forward area of the cabin to a rear area of the cabin. Additionally, the actuator 522 may be configured to avoid contact with the roof or headliner of the vehicle cabin. In one embodiment, the actuator 522 may be cable-based and wound or unwound on a pulley or drum. In an alternative embodiment, a more rigid Z-position actuator may be used, such as a scissor actuator configured to translate linear motion in the X-Y plane to vertical displacement in the Z-axis and to utilize little to no headspace above the frame 510 to avoid hitting the headliner.

In one embodiment, a gimbal may be coupled to an end of the actuator 522, and the test device 200 may be supported by the gimbal, similar to the gimbal arrangement in the system 400. The gimbal may be configured to control an angular orientation of the test device 200 in accordance with a command from the controller 550.

With the system 500, the controller 550 may control a position, including an orientation, of the test device 200 within the interior space 11 of the object 10. The position may be changed in accordance with test criteria or a calibration procedure, and information may be obtained from the object device 50 for each position. This way, truth information may be obtained for the test device 200 at a plurality of positions in the interior space 11. The controller 550, like the controller 410, may communicate this truth information to another device to tune or train the locator 210. Alternatively, the controller 550, itself, may use the truth information to tune or train the locator 210.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A system for obtaining location data for a portable device relative to an object, the system comprising:
   an object device disposed in a fixed position relative to the object, the object device having an antenna configured to communicate wirelessly with the portable device via a communication link;
   a control system configured to obtain one or more samples for pertaining to communications between the portable device and the object device, the control system configured to obtain a first set of the one or more samples with respect to the portable device being at a first position, the control system configured to obtain a second set of the one or more samples with respect to the portable device being at a second position;
   a movable body operably coupled to the portable device, the movable body being configured to position the portable device in accordance with a position directive communicated from the control system, the movable body including a gimbal capable of changing an angular orientation of the portable device independent of a position of the movable body; and
   the control system configured to direct movement of the movable body to change a position of the portable device from the first position to the second position.

2. The system of claim 1 wherein the movable body is configured to change the angular orientation of the portable device in accordance with an orientation directive communicated from the control system.

3. The system of claim 2 wherein the movable body is configured to change the angular orientation from a first orientation at the first position to a second orientation at the first position, wherein the control system is configured to obtain the first set of the one or more samples at the first orientation at the first position and to obtain the second set of the one or more samples at the second orientation at the second position.

4. The system of claim 1 comprising a locator operable for calibration based on the one or more samples obtained with respect to communications with the portable device, and wherein the locator is configured to provide an output based on input indicative of a signal characteristic of communications, wherein the output is indicative of a location of the portable device relative to the object.

5. The system of claim 1 wherein the first set of the one or more samples includes at least a first one of the one or more samples.

6. The system of claim 1 wherein the object is a vehicle having a vehicle cabin that defines an interior space of the vehicle.

7. The system of claim 1 wherein the one or more samples include information pertaining to a signal characteristic of communications, the position of the portable device during measurement of the signal characteristic, and an angular orientation of the portable device during measurement of the signal characteristic.

8. The system of claim 7 wherein the signal characteristic is a signal strength of communications from the portable device to the antenna of the object device.

9. The system of claim 1 wherein the position of the portable device during a measurement of a signal characteristic is stored separate from the one or more samples and correlated with the one or more samples based on time of sampling.

10. The system of claim 1 comprising a plurality of object sensor devices, wherein each of the plurality of object sensor devices is disposed in a fixed position relative to the object, and wherein a signal characteristic of communications is obtained with respect to each of the plurality of object sensor devices.

11. The system of claim 1 wherein a plurality of signal characteristics is obtained by the object device, and wherein the plurality of signal characteristics are different from each other.

12. A system for obtaining location data for a portable device relative to an object, the system comprising:
   an object device disposed in a fixed position relative to the object, the object device having an antenna configured to communicate wirelessly with the portable device via a communication link;
   a control system configured to obtain one or more samples for pertaining to communications between the portable device and the object device, the control system configured to obtain a first set of the one or more samples with respect to the portable device being at a first position, the control system configured to obtain a second set of the one or more samples with respect to the portable device being at a second position;
   a movable body operably coupled to the portable device, the movable body being configured to position the portable device in accordance with a position directive communicated from the control system;
   the control system configured to direct movement of the movable body to change a position of the portable device from the first position to the second position;
   one or more flexible members each having a first end and a second end;
   a main portion of the movable body being coupled to the first end of each of the one or more flexible members; and
   one or more support members disposed in a fixed position relative to the object and coupled respectively to the second end of at least one of the one or more flexible members.

13. The system of claim 12 wherein:
   the one or more support members includes a first support member, a second support member, and a third support member;
   the one or more flexible members includes a first flexible member, a second flexible member, and a third flexible member;
   the second end of the first flexible member is coupled to the first support member;
   the second end of the second flexible member is coupled to the second support member; and
   the second end of the third flexible member is coupled to the third support member.

14. The system of claim 13 wherein each of the first, second, and third support members is configured to reel and unreel respectively the first, second, and third flexible members, whereby the position of the movable body in three-dimensional space is adjustable by controlling an unreeled length of the first, second, and third flexible members.

15. The system of claim 12 comprising a first beam and a second beam disposed at least partially in an interior space of the object, wherein the one or more support members is operably coupled to the first beam and the second beam and movable in a two-dimensional plane relative to and defined by the first beam and the second beam, wherein the one or more flexible members includes a first flexible member capable of being adjusted in length to change a displacement of the movable body relative to the two-dimensional plane.

16. A method of determining location information pertaining to a location of a remote device relative to an object, the method comprising:
- providing a reference device capable of communicating wirelessly with the object via a communication link;
- providing a gimbal operably coupled to the reference device to control an angular orientation of the reference device independent of a position of the reference device in three-dimensional space;
- disposing the reference device at a first position relative to the object;
- obtaining one or more first position samples for a signal characteristic of communications with the reference device at the first position;
- automatically moving the reference device from the first position to a second position relative to the object; and
- obtaining one or more second position samples for the signal characteristic of communications with the reference device at the second position.

17. The method of claim 16 comprising determining one or more parameters for a locator based on the one or more first position samples and the one or more second position samples.

18. The method of claim 16 comprising:
- rotating the reference device, at the first position, from a first angular orientation to a second angular orientation; and
- obtaining the one or more first position samples for the signal characteristic at the first angular orientation at the first position, wherein the one or more first position samples correspond to one or more first angular orientation samples.

19. The method of claim 18 comprising obtaining one or more second angular position samples for the signal characteristic at the second angular orientation at the first position.

20. The method of claim 18 wherein the first angular orientation is different from the second angular orientation by at least one of pitch, roll, and yaw.

21. The method of claim 16 wherein the first position and the second position are inside the object.

22. The method of claim 16 comprising:
- providing a movable body to support the reference device; and
- reeling at least one cable coupled to the movable body to change a position of the reference device from the first position to the second position.

23. The method of claim 16 comprising:
- providing a temporary frame with a first beam and a second beam spanning an interior space of the object, wherein the first and second beams define a first plane; and
- vertically displacing the reference device relative to the first plane within the interior space of the object from the first position to the second position.

24. The method of claim 16 comprising:
- providing a plurality of object sensor devices respectively in a fixed position relative to the object; and
- obtaining a sample of the signal characteristic in each of the plurality of object sensor devices at each of the first and second positions.

25. The method of claim 16 wherein the signal characteristic corresponds to a signal strength of wireless communications.

26. The method of claim 16 wherein the signal characteristic corresponds to a time of flight of wireless communications.

27. A method of determining location information pertaining to a location of a remote device relative to an object, the method comprising:
- providing a reference device capable of communicating wirelessly with the object via a communication link;
- disposing the reference device at a first position relative to the object;
- obtaining one or more first position samples for a signal characteristic of communications with the reference device at the first position;
- automatically moving the reference device from the first position to a second position relative to the object;
- obtaining one or more second position samples for the signal characteristic of communications with the reference device at the second position;
- providing a movable body to support the reference device;
- reeling at least one cable coupled to the movable body to change a position of the reference device from the first position to the second position; and
- unreeling the at least one cable coupled to the movable body to change the position of the reference device from the second position to a third position, wherein the second position is different from the third position in three-dimensional space by at least one of an X coordinate, a Y coordinate, and a Z coordinate in a Cartesian coordinate system for the three-dimensional space.

\* \* \* \* \*